(12) United States Patent
Inoue

(10) Patent No.: US 12,311,740 B2
(45) Date of Patent: May 27, 2025

(54) CONNECTIVE STRUCTURE FOR COWL LOUVER AND WINDSHIELD WITH MOLDING

(71) Applicant: AGC Inc., Tokyo (JP)

(72) Inventor: Takafumi Inoue, Tokyo (JP)

(73) Assignee: AGC Inc., Tokyo (JP)

( * ) Notice: Subject to any disclaimer, the term of this patent is extended or adjusted under 35 U.S.C. 154(b) by 379 days.

(21) Appl. No.: 18/072,254

(22) Filed: Nov. 30, 2022

(65) Prior Publication Data

US 2023/0121180 A1 Apr. 20, 2023

Related U.S. Application Data

(63) Continuation of application No. PCT/JP2021/020442, filed on May 28, 2021.

(30) Foreign Application Priority Data

Jun. 2, 2020 (JP) ................... 2020-096183

(51) Int. Cl.
*B60J 1/00* (2006.01)
*B60J 1/02* (2006.01)
(Continued)

(52) U.S. Cl.
CPC ............... *B60J 1/006* (2013.01); *B60J 1/02* (2013.01); *B62D 25/081* (2013.01); *B60J 10/70* (2016.02)

(58) Field of Classification Search
CPC ... B60J 1/006; B60J 1/02; B60J 10/70; B62D 25/081
(Continued)

(56) References Cited

U.S. PATENT DOCUMENTS 8,628,137 B2 * 1/2014 Platt .................... B60J 10/30
296/84.1
2013/0033071 A1 2/2013 Kurata et al.
(Continued)

FOREIGN PATENT DOCUMENTS

JP 5873266 B2 3/2016
WO WO-2015/181960 A1 12/2015
WO WO-2018198959 A1 * 11/2018 .............. B60J 1/001

OTHER PUBLICATIONS

International Searching Authority, "International Search Report," issued in connection with International Patent Application No. PCT/JP2021/020442, dated Aug. 3, 2021.
(Continued)

*Primary Examiner* — Amy R Weisberg
*Assistant Examiner* — Dana D Ivey
(74) *Attorney, Agent, or Firm* — Foley & Lardner LLP

(57) ABSTRACT

A connecting structure for a windshield with molding and a cowl louver, the cowl louver having a clamping portion with U-form longitudinal cross section formed by a first clamping portion and a second clamping portion having an engaged portion, and a molding of a first molding portion and a second molding portion and having an engaging portion, wherein the clamping portion has a contact region located ahead of the engaged portion and in contact with at least a part of the front portion of the second molding portion, and before the second molding portion is held in the clamping portion, the length of a part of the front portion in the longitudinal cross section is longer than the distance between the vehicle interior side surface of the first clamping portion and the vehicle exterior side surface of the second clamping portion in a part of the contact region.

13 Claims, 10 Drawing Sheets

(51) Int. Cl.
*B62D 25/08* (2006.01)
*B60J 10/70* (2016.01)

(58) Field of Classification Search
USPC .............................................. 296/146.1, 192
See application file for complete search history.

(56) References Cited

U.S. PATENT DOCUMENTS

| 2015/0328963 | A1* | 11/2015 | Lee .......................... | B60J 1/005 |
| | | | | 296/192 |
| 2016/0176276 | A1* | 6/2016 | Sanada ...................... | B60J 1/02 |
| | | | | 296/96.21 |

OTHER PUBLICATIONS

International Searching Authority, "Written Opinion," issued in connection with International Patent Application No. PCT/JP2021/020442, dated Aug. 3, 2021.
PCT International Preliminary Report on Patentability, dated Dec. 6, 2022, which includes a Translation of International Searching Authority, "Written Opinion," issued in connection with International Patent Application No. PCT/JP2021/020442, dated Aug. 3, 2021.

* cited by examiner

CONNECTIVE STRUCTURE FOR COWL LOUVER AND WINDSHIELD WITH MOLDING

CROSS-REFERENCE TO RELATED APPLICATIONS

This application is a Bypass Continuation of PCT Application No. PCT/JP2021/020442, filed on May 28, 2021, which is based upon and claims the benefit of priority from Japanese Patent Application No. 2020-096183 filed on Jun. 2, 2020. The contents of those applications are incorporated herein by reference in their entireties.

TECHNICAL FIELD

The present invention relates to a connecting structure for a windshield with molding and a cowl louver.

BACKGROUND ART

Patent Document 1 discloses a connecting structure for a windshield with molding and a cowl louver, comprising a cowl cover support member, also called a molding, supporting the rear end portion of a cowl cover, along the lower end portion of a windshield of a vehicle, wherein the cowl cover support member has a plurality of stop portions formed at a distance in the vehicle width direction on a support portion, with which the rear end surface of a rear end engaging portion of the cowl cover is in contact, and engaging portions formed between the stop portions on the support portion, engaging with the rear end engaging portion of the cowl cover and inhibiting movement of the cowl cover in the vehicle width direction.

PRIOR ART DOCUMENTS

Patent Documents

Patent Document 1: WO2015/181960

DISCLOSURE OF INVENTION

Technical Problem

However, the connecting structure in Patent Document 1 is a simple structure by which the engaging portion of the cowl cover support member and an engaged portion of the cowl cover are merely engaged, and thus it is difficult to prevent infiltration of water from the vehicle exterior side into the vehicle interior side.

Under these circumstance, it is an object of the present invention to provide a connecting structure for a windshield with molding and a cowl louver, which can prevent infiltration of water from the vehicle exterior side.

Solution to Problem

The connecting structure for a windshield with molding and a cowl louver according to an embodiment of the present invention, is a connecting structure for a windshield with molding and a cowl louver, to be attached to a vehicle, wherein the windshield with molding has a laminated glass having a first glass plate to be disposed on the vehicle exterior side, a second glass plate to be disposed on the vehicle interior side, and an interlayer to bond the first glass plate and the second glass plate, and a molding assembled on the lower edge portion of the laminated glass, the cowl louver has a clamping portion having a U-form longitudinal cross section formed by a first clamping portion exposed to the vehicle exterior side at the vehicle rear end side, and a second clamping portion formed on the vehicle interior side of the cowl louver, extending toward the rear side of the vehicle with a predetermined distance from the first clamping portion, the molding and the cowl louver are fitted by the clamping portion, the molding has a first molding portion, the upper side of which is bonded to the vehicle interior side surface of the second glass plate, a second molding portion held in the clamping portion, extending from the first molding portion toward the front of the vehicle, and an engaging portion protruding toward the vehicle interior side surface, the second molding portion has a front portion located ahead of the engaging portion, the second clamping portion has an engaged portion to be engaged with the engaging portion, the clamping portion has a contact region located ahead of the engaged portion and in contact with at least a part of the front portion, and in a state before the second molding portion is held in the clamping portion, the length of at least a part of the front portion in the longitudinal cross section is longer than the distance between the vehicle interior side surface of the first clamping portion and the vehicle exterior side surface of the second clamping portion in at least a part of the contact region.

Advantageous Effects of Invention

According to the connecting structure for a windshield with molding and a cowl louver of the present invention, it is possible to prevent infiltration of water from the vehicle exterior side into the vehicle interior side.

DESCRIPTION OF EMBODIMENTS

Now, preferred embodiments of the connecting structure for a windshield with molding and a cowl louver according to the present invention will be described with reference to the drawings. In the following drawings, the identical or similar members are described with the same symbols, and repetition of description may sometimes be omitted. In this specification, the descriptions "upward (U)/downward (D)", "front (F)/rear (R)", "inside (In)/outside (Out)" and "left (Le)/right (Ri)" representing the direction or position means the direction or position when attached to a vehicle.

First Embodiment

Figure 1:
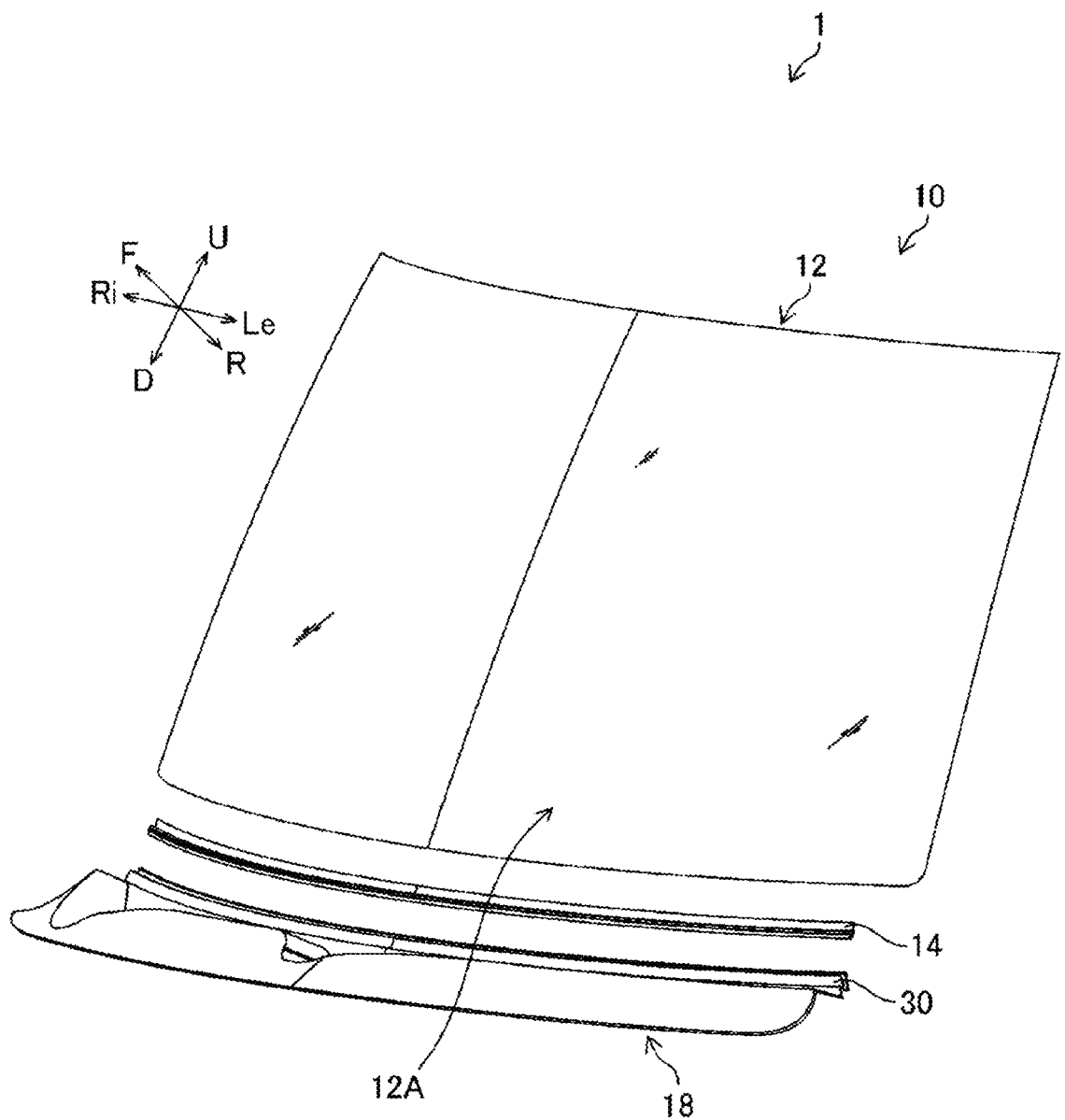
FIG. 1 is a perspective view illustrating assembling of the connecting structure for a windshield with molding and a cowl louver according to a first embodiment of the present invention.
Figure 2:
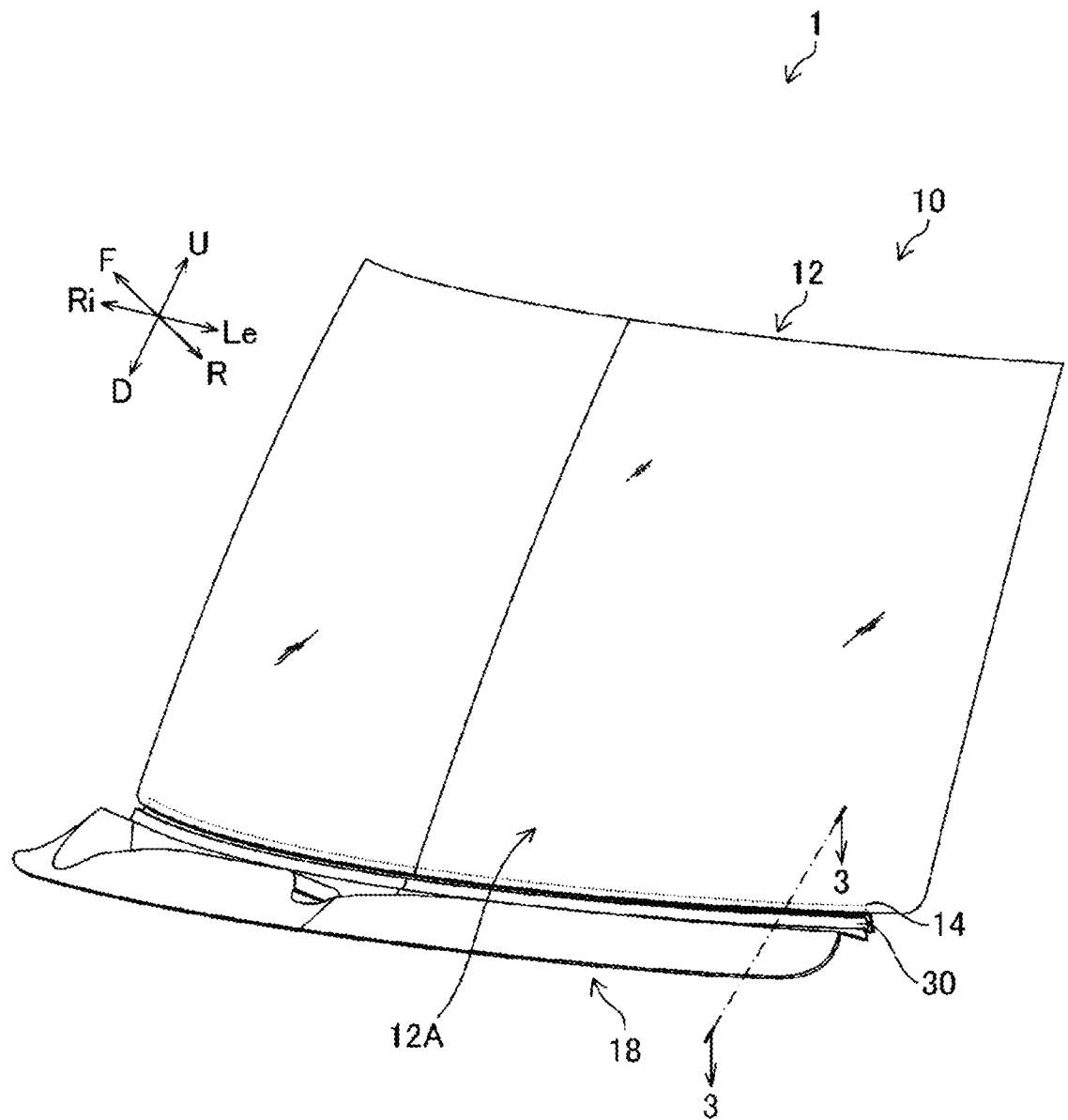
FIG. 2 is a perspective view illustrating the connecting structure for a windshield with molding and a cowl louver.
Figure 3:
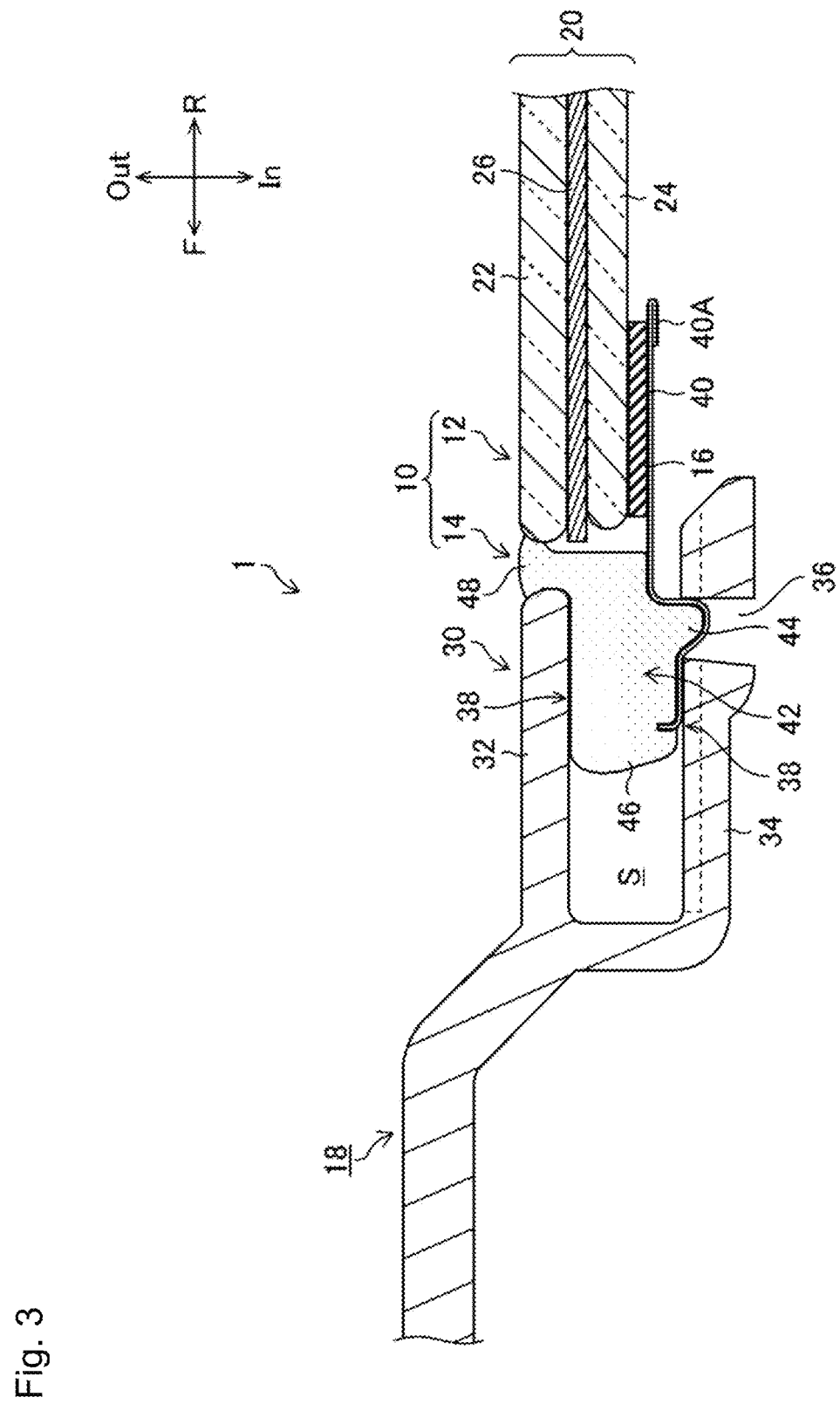
FIG. 3 is a cross sectional view illustrating the first embodiment along the line 3-3 in FIG. 2.

FIG. 1 is a perspective view before assembling of the windshield, the molding and the cowl louver according to a first embodiment of the present invention, and FIG. 2 is a perspective view illustrating the connecting structure for a windshield with molding and a cowl louver in a state where the cowl louver is connected to the windshield with molding. FIG. 3 is a longitudinal cross sectional view illustrating the connecting structure 1 for a windshield with molding and a cowl louver along the line 3-3 in FIG. 2

As shown in FIGS. 1 to 3, the connecting structure 1 for a windshield with molding and a cowl louver according to the first embodiment comprises a windshield 10 with molding having a windshield 12 and a molding 14, and a cowl louver 18.

As shown in FIG. 3, the windshield 12 is a windshield to be attached to a frame (not shown) on the front side of the vehicle and is constated by a laminated glass 20. That is, the windshield 12 is composed of a laminated glass having a first glass plate 22 to be disposed on the vehicle exterior side, a second glass plate 24 to be disposed on the vehicle interior side, and an interlayer 26 to bond the first glass plate 22 and the second glass plate 24.

The materials composing the first glass plate 22 and the second glass plate 24 may be inorganic glass or organic glass. As inorganic glass, for example, soda lime glass, aluminosilicate glass, borosilicate glass, alkali free glass or quartz glass may be used without any particular restriction. The first glass plate 22 disposed on the vehicle exterior side is preferably made of inorganic glass from the viewpoint of scratch resistance, preferably soda lime glass from the viewpoint of forming property. In a case where the first glass plate 22 and the second glass plate 24 are made of soda lime glass, clear glass, green glass containing iron contents in a predetermined amount or more, or UV cut green glass may suitably be used.

The inorganic glass may be either non-tempered glass or tempered glass. Non-tempered glass is one obtained by forming molten glass into a plate, followed by annealing. Tempered glass is one having a compression stress layer formed on the surface of non-tempered glass.

Tempered glass may be either physically tempered glass such as air-tempered glass or chemically tempered glass. In a case of physically tempered glass, the glass surface may be tempered, for example, by forming a compression stress layer on the glass surface by a temperature difference between the glass surface and the glass interior e.g. by operation other than annealing, such as quenching a glass plate uniformly heated in bending, from a temperature in the vicinity of the softening point.

In a case of chemically tempered glass, the glass surface may be tempered, for example, after bending, by forming compression stress on the glass surface e.g. by ion exchange method. Further, glass which absorbs ultraviolet rays or infrared rays may be used, and glass is preferably transparent, but a glass plate colored to such an extent not to impair transparency may be used.

On the other hand, as a material of organic glass, a transparent resin such as a polycarbonate, an acrylic resin such as polymethyl methacrylate, a polyvinyl chloride or a polystyrene may be mentioned.

The shape of the first glass plate 22 and the second glass plate 24 is not particularly limited to rectangular, and may be any shape with any curvature. For bending the first glass plate 22 and the second glass plate 24, gravity forming, pressing, roller forming or the like may be employed. The method for forming the first glass plate 22 and the second glass plate 24 is not particularly limited, and for example, in the case of inorganic glass, a glass plate formed by float process is preferred.

The plate thickness of the first glass plate 22 is preferably 1.1 mm or more and 3 mm or less at the thinnest portion. When the plate thickness of the first glass plate 22 is 1.1 mm or more, strength such as flying stone resistance will be sufficient, and when it is 3 mm or less, the mass of the laminated glass 20 will not be too large, such being preferred in view of mileage of the vehicle, The plate thickness of the first glass plate 22 is more preferably 1.8 mm or more and 2.8 mm or less at the thinnest portion, further preferably 1.8 mm or more and 2.6 mm or less, still more preferably 1.8 mm or more and 2.2 mm or less, even more preferably 1.8 mm or more and 2.0 mm or less.

The plate thickness of the second glass plate 24 is preferably 0.3 mm or more and 2.3 mm or less. When the plate thickness of the second glass plate 24 is 0.3 mm or more, good handling efficiency will be obtained, and when it is 2.3 mm or less, the mass will not be too large.

When the laminated glass 20 is used, for example, for a head-up display, the first glass plate 22 and the second glass plate 24 may not have a constant plate thickness and may have a non-uniform plate thickness by location as the case requires. For example, either one or both of the first glass plate 22 and the second glass plate 24 may have a wedge cross section such that the plate thickness increases from the lower side toward the upper side of the windshield, in a state where the windshield is attached to the vehicle. In such a case, when the film thickness of the interlayer 26 is constant, the total wedge angle of the first glass plate 22 and the second glass plate 24 varies for example, within a range of more than 0 mrad and 1.0 mrad or less.

A coating film having a function such as water repellency, ultraviolet or infrared shielding, or a coating film having low reflection or low emission properties, may be formed outside the first glass plate 22 and/or the second glass plate 24. Further, an ultraviolet or infrared shielding, low emission, visible light absorption, or colored coating film, may be formed on the side in contact with the interlayer 26 of the first glass plate 22 and/or the second glass plate 24.

In a case where the first glass plate 22 and the second glass plate 24 are curved inorganic glass plates, the first glass plate 22 and the second glass plate 24 are bent after formation by float process and before bonding by the interlayer 26. Bending is carried out by heating and softening the glass plate. The glass plate heating temperature at the time of bending is from about 550° C. to about 700° C.

For the interlayer 26, a thermoplastic resin is used in many cases, and for example, a thermoplastic resin which has been used for such a type of application, such as a plasticized polyvinyl acetal resin, a plasticized polyvinyl chloride resin, a saturated polyester resin, a plasticized saturated polyester resin, a polyurethane resin, a plasticized polyurethane resin, an ethylene/vinyl acetate copolymer resin, an ethylene/ethyl acrylate copolymer resin, a cycloolefin polymer resin or an ionomer resin may be mentioned. Further, a resin composition containing a modified block copolymer hydride disclosed in Japanese Patent No. 6065221 may also be suitably used.

Among them, in view of excellent balance of various performances such as transparency, weather resistance, strength, adhesion, penetration resistance, impact energy absorption property, moisture resistance, heat shielding property and sound insulating property, a plasticized polyvinyl acetal resin is suitably used. Such a thermoplastic resin may be used alone or in combination of two or more. "Plasticized" in the plasticized polyvinyl acetal resin means being plasticized by addition of a plasticizer. The same applies to the other plasticized resins.

However, in a case where a light-emitting device 15 is sealed in the interlayer 26, the device may be deteriorated by a specific plasticizer depending upon the type of the device to be sealed, and in such a case, it is preferred to use a resin containing substantially no such a plasticizer. That is, the interlayer 13 preferably contains no plasticizer in some cases. The resin containing no plasticizer may, for example, be an ethylene/vinyl acetate copolymer resin.

The polyvinyl acetal resin may be a polyvinyl formal resin obtained by reacting polyvinyl alcohol (PVA) and formaldehyde, a narrowly defined polyvinyl acetal resin obtained by reacting PVA and acetaldehyde, a polyvinyl butyral resin (PVB) obtained by reacting PVA and n-butyraldehyde, or the like. Particularly in view of excellent balance of various performances such as transparency, weather resistance, strength, adhesion, penetration resistance, impact energy absorbing property, moisture resistance, heat shielding property and sound insulating property, PVB is mentioned as a preferred polyvinyl acetal resin. Such a polyvinyl acetal resin may be used alone or in combination of two or more.

However, the material forming the interlayer 26 is not limited to a thermoplastic resin. The interlayer 26 may contain functional particles of an infrared absorbing agent, an ultraviolet absorbing agent or a light emitting agent. Further, the interlayer 26 may have a colored portion called a shade band (colored processed portion having a function to decrease visible light transmittance). The coloring pigment to be used for forming the colored portion is not particularly limited so long as it can be used for plastic and it achieves a visible light transmittance at the colored portion of 40% or less, and for example, an azo, phthalocyanine, quinacridone, perylene, perinone, dioxazine, anthraquinone or isoindolinone organic coloring pigment or an inorganic coloring pigment such as an oxide, a hydroxide, a sulfide, a chromate, a sulfate, a carbonate, a silicate, a phosphate, an arsenate, a ferrocyanide, carbon or a metal powder may be mentioned. Such a coloring pigment may be used alone or in combination of two or more. The amount of the coloring pigment added may be optional depending upon the desired color and is not particularly limited so long as a visible light transmittance at the colored portion of 40% or less is achieved.

The film thickness of the interlayer 26 is preferably 0.5 mm or more at the thinnest portion. When the film thickness of the interlayer 26 at the thinnest portion is 0.5 mm or more, sufficient impact resistance required as the laminated glass will be achieved. Further, the film thickness of the interlayer 26 is preferably 3 mm or less at the thickest portion. When the film thickness of the interlayer 26 at the thickest portion is 3 mm or less, the mass of the laminated glass may not be too large. The maximum value of the film thickness of the interlayer 26 is more preferably 2.8 mm or less, further preferably 2.6 mm or less.

When the laminated glass 20 is used, for example, for a head-up display, the interlayer 26 may not have a constant film thickness and may have a non-uniform film thickness by location as the case requires. For example, the interlayer 26 may have a wedge cross section such that the film thickness increases from the lower side toward the upper side of the windshield, in a state where the windshield is attached to a vehicle. In such a case, when the plate thicknesses of the first glass plate 22 and the second glass plate 24 are constant, the wedge angle of the interlayer 26 varies, for example, within a range of more than 0 mrad and 1.0 mrad or less.

The interlayer 26 may have three or more layers. For example, by the interlayer having three or more layers such that the elastic modulus in shear of any layer excluding both the outermost layers is smaller than the elastic moduli in shear of both the outermost layers, e.g. by adjustment by a plasticizer, the sound insulating property of the laminated glass 20 can be improved. In such a case, the elastic moduli in shear of both the outermost layers may be the same or different.

The total thickness of the laminated glass 20 is preferably 2.8 mm or more and 10 mm or less. When the total thickness of the laminated glass 20 is 2.8 mm or more, sufficient stiffness can be secured. Further, when the total thickness of the laminated glass 20 is 10 mm or less, a sufficient transmittance will be obtained and the haze can be reduced at the same time.

To produce the laminated glass 20, the interlayer 26 is sandwiched between the first glass plate 22 and the second glass plate 24 to form a laminate. The laminate is put, for example, in a plastic bag or a rubber chamber, or a resin bag, and bonded in vacuum under a pressure of −65 kPa to −100 kPa at a temperature of from about 70 to about 110° C. The heating conditions, the temperature conditions and the laminate method are properly selected considering the properties of the light emitting device 15, for example, so that it will not be deteriorated during lamination.

Further, for example, by contact bonding treatment of heat pressing the laminate at a temperature of from 100° C. to 150° C. under a pressure of from 0.6 to 1.3 MPa, a laminated glass 20 with more excellent durability can be obtained. However, considering simplification of the process and properties of the material to be sealed in the laminated glass 20, in some cases, the heat pressing step may not be employed.

That is, a method called "cold bending" may be employed such that the first glass plate 22 and the second glass plate 24 are bonded in a state where either one or both of the glass plates underwent elastic deformation. Cold bending may be conducted by using a laminate of the first glass plate 22, the second glass plate 24 and the interlayer 26 fixed by a temporary fixing means such as a tape, a known preliminary contact bonding apparatus such as a nip roller, a plastic bag or a rubber chamber, and an autoclave.

The laminate may have, between the first glass plate 22 and the second glass plate 24, in addition to the interlayer 26, within a range not to impair the effects of the present invention, a film or a device having a function of heating wire, infrared reflection, light emission, photoelectric, light control, touch panel, visible light reflection, scattering, decoration, absorption, etc. Further, the laminated glass 20 may have, on its surface, a film having a function of e.g. antifogging, water repellency, heat shielding, low reflection, etc. Further, the laminate may have, on the surface on the vehicle exterior side of the first glass plate 22 or on the surface on the vehicle interior side of the second glass plate 24, a film having a function of e.g. heat shielding or heat generation.

The cowl louver 18 is, for example, a plate-formed member formed of a propylene injection-molded product. The cowl louver 18 is disposed between a hood (not shown) and the windshield 12 and extends to the vehicle width direction (left and right direction) along the lower end portion of the windshield 12. The cowl louver 18 has a clamping portion 30 having a U-form longitudinal cross section on the vehicle rear end side.

The molding 14 functions as a connecting member to connect the clamping portion 30 of the cowl louver 18 to the lower edge portion 12A of the windshield 12. The molding 14 extends in the vehicle width direction along the lower edge portion 12A of the windshield 12. The molding 14 is assembled on the vehicle interior side surface at the lower edge portion 12A of the windshield 12 by a double-sided adhesive tape 16 (see FIG. 3).

As shown in FIG. 2, a windshield 10 with molding having a windshield 12 and a molding 14, and a cowl louver 18 are prepared. In the clamping portion 30 of the cowl louver 18, the molding 14 and the cowl louver 18 are fitted, and the cowl louver 18 is connected to the molding 14 of the windshield 10 with molding. In such a manner, the connecting structure 1 for a windshield with molding and a cowl louver is constituted.

As shown in FIG. 3, the molding 14 has a first molding portion 40, the upper surface of which is bonded to the vehicle interior side surface of the second glass plate 24, and a second molding portion 42 held in the clamping portion 30 of the cowl louver 18 and extending from the first molding portion 40 toward the front (F) of the vehicle. The second molding portion 42 has an engaging portion 44 protruding toward the vehicle interior (In) side, and a front portion 46 located ahead (F) of the engaging portion 44.

The vehicle interior side surface of the second glass plate 24 and the upper surface the first molding portion 40 can be bonded by means of a double-sided adhesive tape 16. Instead of the double-sided adhesive tape 16, a known acrylic resin, urethane resin or epoxy resin-based adhesive or the like may also be used.

In the first embodiment, the first molding portion 40 is composed of a thin plate-formed metal member of e.g. stainless steel or steel. The plate thickness of the metal member is, for example, 0.2 mm or more and 1.2 mm less. The first molding portion 40 has a bent portion 40A at which it is bent toward the front end side, at its rear end side. The bent portion 40A is so-called hemming, and the first molding portion 40 is reinforced by the bent portion. The first molding portion 40 extends toward the second molding portion 42.

The second molding portion 42 is composed of a flexible resin member of e.g. a thermoplastic olefinic elastomer (TPO), Alcryn (registered trademark, thermoplastic elastomer), or PVC. The hardness (JIS K6253 type A durometer hardness (hereinafter referred to as "hardness")) of the second molding portion 42 is preferably, for example, 40 degrees or more and 70 degrees or less.

The engaging portion 44 preferably has a length corresponding to 90% or more of the length in the vehicle width direction (left and right direction) of the second molding portion 42. The length of the engaging portion 44 may be 90% or more of the above length continuously or at a distance in a part, that is discontinuously.

In the first embodiment, a part of the metal member composing the first molding portion 40 extends toward the second molding portion 42 side and is bent toward the vehicle interior side. At the bent portion of first molding portion 40, an engaging portion 44 is formed. A part of the first molding portion 40 is held in the clamping portion 30 and constitutes the engaging portion 44 as a part of the second molding portion 42.

The first molding portion 40 of the molding 14 may be a roll-formed product formed continuously by roll forming. The second molding portion 42 of the molding 14 may be an extruded product formed continuously by extrusion. Thus, the molding 14 may be formed by continuously forming the first molding portion 40 by roll forming and continuously forming, on the roll-formed first molding portion 40, the second molding portion 42 by extrusion. That is, the molding 14 may be a continuously formed product comprising the first molding portion 40 as a roll-formed product and the second molding portion 42 as an extruded product. Since the engaging portion 44 has a length of 90% or more of the length in the vehicle width direction, the molding 14 may be continuously produced by roll forming and extrusion. In a case where the first molding portion 40 is a metal member, the molding 14 can follow a complicated shape by deforming the first molding portion 40.

The clamping portion 30 of the cowl louver 18 has a first clamping portion 32 exposed to the vehicle exterior side, and a second clamping portion 34 formed on the vehicle interior side of the cowl louver 18 and extending toward the vehicle rear (R) side at a predetermined distance from the first clamping portion 32. The clamping portion 30 has a U-form longitudinal cross section formed by the first clamping portion 32 and the second clamping portion 34. The longitudinal cross section means a cross section obtained by cutting the cowl louver 18 in a plane substantially orthogonal to the vehicle width direction.

The second clamping portion 34 has an engaged portion 36 to be engaged with the engaging portion 44 of the molding 14. The engaged portion 36 may hold a part of the engaging portion 44 and is composed of a plurality of through holes formed on the second clamping portion 34. The engaged portion 36 is not limited to through-holes, and may be grooves formed in the second clamping portion 34 so long as a part of the engaging portion 44 can be held.

Figure 4:
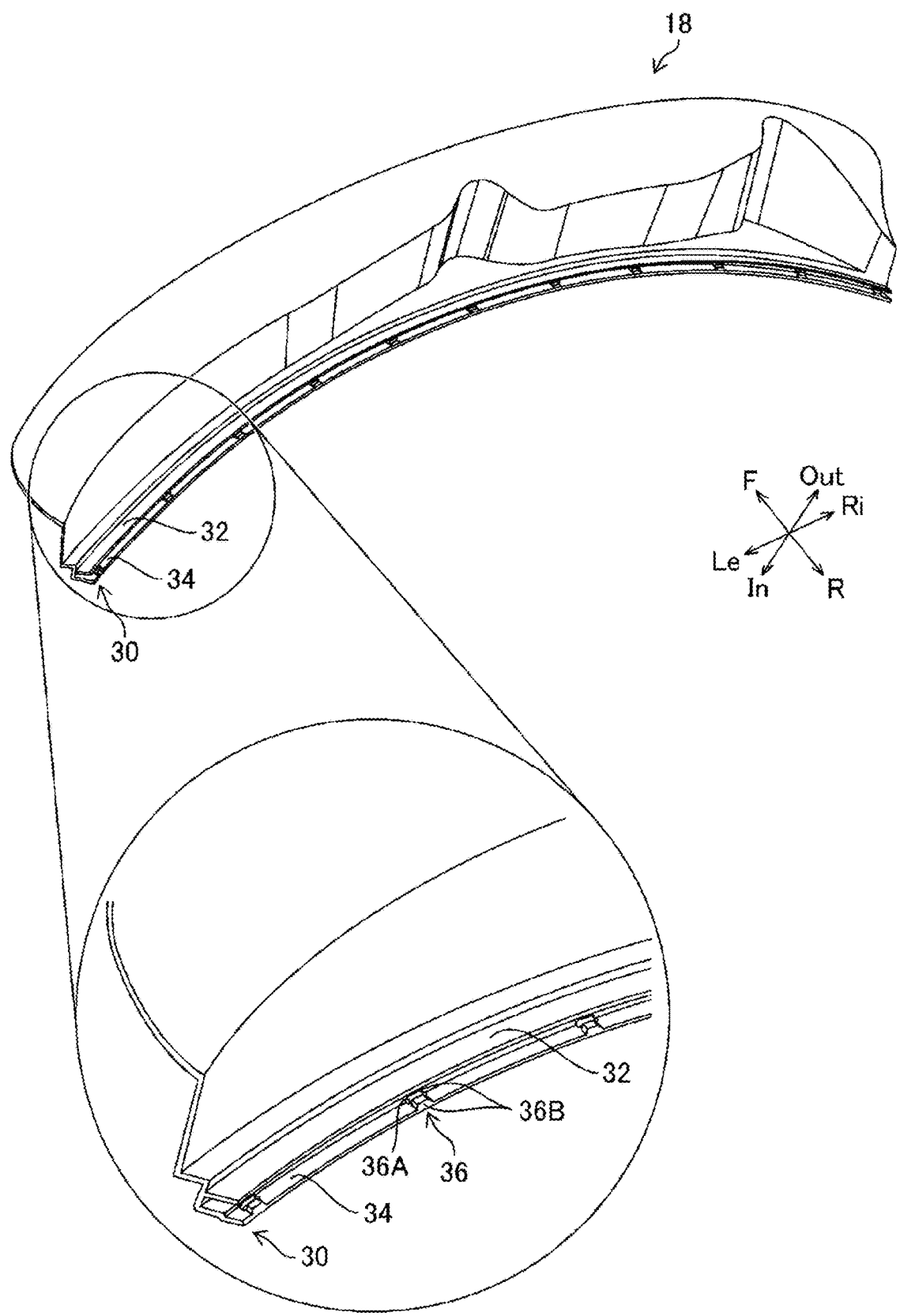
FIG. 4 is a perspective view illustrating the cowl louver as viewed from the clamping portion side.

As shown in FIG. 4, in the cowl louver 18, the first clamping portion 32 has a shape continuously extending in the vehicle width direction. Likewise, the second clamping portion 34 preferably has a shape continuously extending in the vehicle width direction. Thus, the clamping portion 30 has a shape continuously extending in the vehicle width direction and functions as a gutter when water infiltrates from the vehicle exterior side.

As shown in the enlarged view in FIG. 4, the engaged portions 36 are formed at a distance along the vehicle width direction in the clamping portion 30. Since the engaged portions 36 are formed at a distance, rigidity of the second clamping portion 34 can be maintained. The distance between adjacent engaged portions 36 is preferably 50 mm or more and 2,000 mm less.

As shown in FIG. 4, the engaged portion 36 is composed of a through hole 36A and ribs 36B formed in the longitudinal direction relative to the through hole 36A.

As shown in FIG. 3, the clamping portion 30 has first and second contact regions 38, located ahead of the engaged portion 36, and in contact with at least a part of the front portion 46 of the second molding portion 42 at the vehicle interior side surface of the clamping portion 32 and the vehicle exterior side surface of the clamping portion 34.

In the first embodiment, the front portion 46 continuously extends in the vehicle width direction of the second molding portion 42, and is held in the clamping portion 30 of the cowl louver 18. As shown in FIG. 3, the front portion 46 and the vehicle interior side surface of the first clamping portion 32 are in contact with each other to constitute the first contact region 38, and the front portion 46 and the vehicle interior side surface of the second clamping portion 34 are in contact with each other to constitute the second contact region 38.

In a state before the second molding portion 42 is held in the clamping portion 30, the length of at least a part of the front portion 46 in the longitudinal cross section, is longer than the distance between the vehicle interior side surface of the first clamping portion 32 and the vehicle exterior side surface of the second clamping portion 34 (hereinafter sometimes referred to as the distance between the contact regions of the clamping portion 30) in at least a part of the first and second contact regions 38. In the first embodiment, the front portion 46 has a substantially quadrangular longitudinal cross section before held in the clamping portion 30.

In the longitudinal cross section of the first and second contact regions 38, the distance between the contact regions of the clamping portion 30 and the front portion 46 have the above relation of the length, and accordingly it is possible to apply a pressure to the front portion 46, the vehicle interior side surface of the first clamping portion 32 and the vehicle exterior side surface of the second clamping portion 34 of the clamping portion 30. Accordingly, in the first and second contact regions 38, the front portion 46 and the clamping portion 30 are brought into contact with each other by the pressure, and thus infiltration of water from outside the vehicle into the vehicle interior side can be prevented.

As shown in FIG. 3, in the first and second contact regions 38, the front portion 46 and the first clamping portion 32, and the front portion 46 and the second clamping portion 34, have portions in contact with each other planarly. By planar contact, the areas of the first and second contact regions 38 become large, and infiltration of water from outside the vehicle into the vehicle interior side can further be prevented. The front portion 46 is deformed to follow the inner wall of the clamping portion 30.

Between the front end portion of the second molding portion 42, and the inner wall of the clamping portion 30 formed by the vehicle interior side surface of the first clamping portion 32 and the vehicle exterior side surface of the second clamping portion 34, a gap S is present. As the gap S is present, even if water passes through the first contact region 38, the clamping portion 30 functions as a gutter so that the water may be moved to an optional position and discharged. The discharge position is preferably disposed at a position avoiding electronic members such as a wiper motor. Further, the discharge position may optionally be set.

As shown in FIG. 3, the second molding portion 42 has a protruding portion 48 protruding on the first glass plate 22 side and located between the first clamping portion 32 and the laminated glass 20. The first clamping portion 32, the protruding portion 48 and the first glass plate 22 are disposed on flush. The first clamping portion 32, the protruding portion 48 and the first glass plate 22 constitute a flush surface. The flush includes a completely same plane and a substantially same plane (within a range of ±1.0 mm).

Second Embodiment

Now, the connecting structure for a windshield with molding and a cowl louver according to a second embodiment of the present invention will be described with reference to FIG. 5. The identical or similar members to those in the first embodiment are described with the same symbols, and repetition of description may sometimes be omitted.

Figure 5:
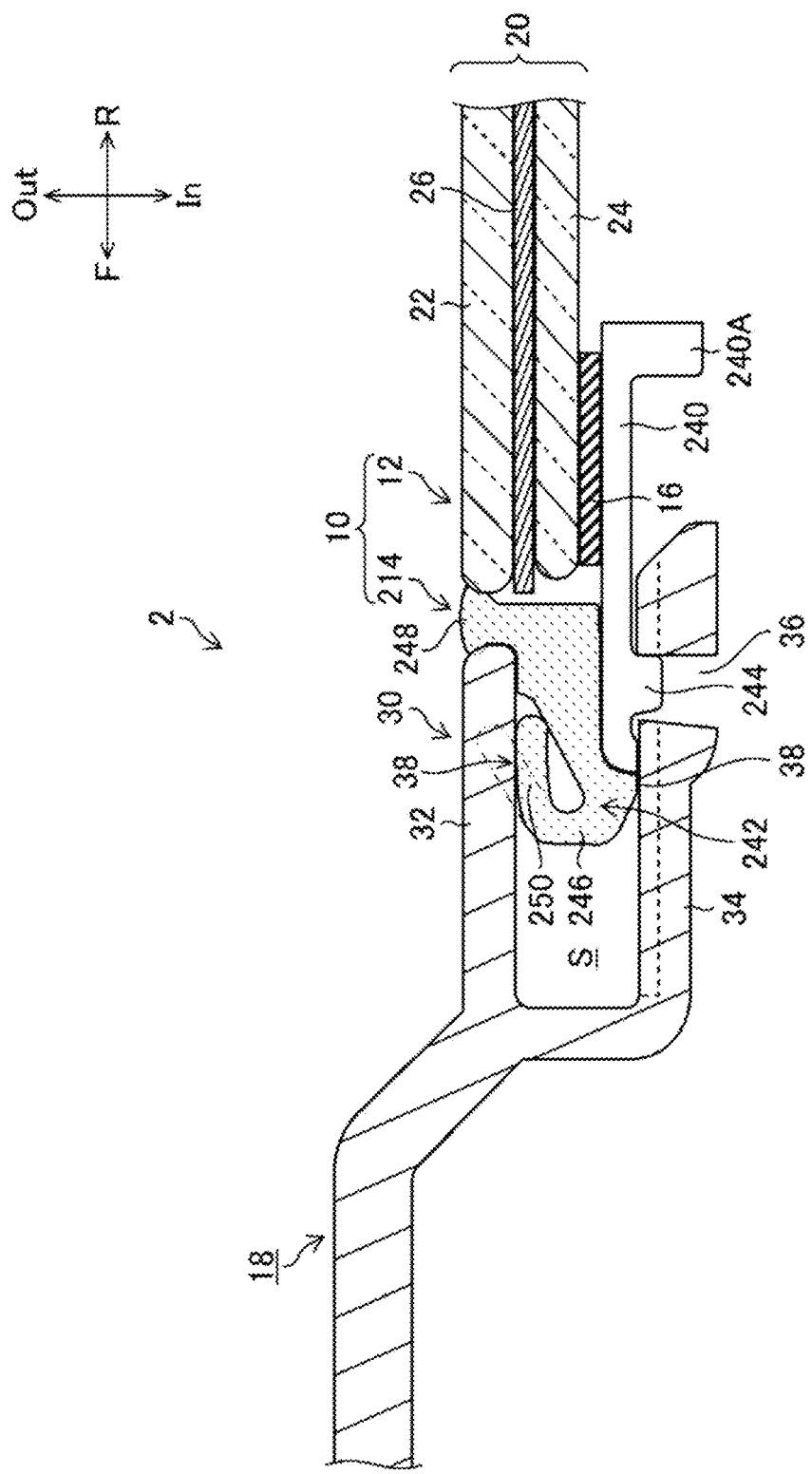
FIG. 5 is a cross sectional view illustrating a second embodiment of the present invention.

As shown in FIG. 5, the connecting structure 2 for a windshield with molding and a cowl louver according to the second embodiment comprises a windshield 10 with molding having a windshield 12 and a molding 214, and a cowl louver 18.

The windshield 12 is composed of, in the same manner as the first embodiment, a laminated glass 20 having a first glass plate 22, an interlayer 26 and a second glass plate 24.

As shown in FIG. 5, in the second embodiment, a molding 214 having a shape different from that in the first embodiment is provided. The molding 214 has a first molding portion 240, the upper surface of which is bonded to the vehicle interior side surface of the second glass plate 24 by means of a double-sided adhesive tape 16, and a second molding portion 242 held in a clamping portion 30 of the cowl louver 18 and extending from the first molding portion 240 toward the front (F) of the vehicle. The molding 214 has an engaging portion 244 protruding toward the vehicle interior (In) side on the first molding portion 240, and the second molding portion 242 has a front portion 246 located ahead (F) of the engaging portion 244.

In the second embodiment, the first molding portion 240 is composed of a plate-formed rigid resin member of e.g. a thermoplastic olefinic elastomer (TPO) or polyvinyl chloride (PVC). The hardness of the first molding portion 240 is preferably, for example, 60 degrees or more and 100 degrees or less. The rear end side of the first molding portion 240 has a protruding portion 240A protruding toward the vehicle interior side. The first molding portion 240 is reinforced by the protruding portion 240A. The first molding portion 240 extends toward the second molding portion 242.

The second molding portion 242, in the same manner as the first embodiment, is composed of a flexible resin member of e.g. a thermoplastic olefinic elastomer, Alcryn (registered trademark) or polyvinyl chloride. The hardness of the second molding portion 242 is, for example, 40 degrees or more and 70 degrees or less, and is smaller than the hardness of the first molding portion 240. In the second embodiment, the resin member composing the first molding portion 240 and the resin member composing the second molding portion 242 are different. Different means being different in at least one of the composition and properties (mechanical, chemical).

The engaging portion 244 preferably has a length corresponding to 90% or more of the length in the vehicle width direction (left and right direction) of the second molding portion 242. The length of the engaging portion 244 may be 90% or more of the above length continuously or at a distance in a part.

In the second embodiment, a part of the resin member composing the first molding portion 240 extends toward the second molding portion 242 side to constitute a protruding portion protruding toward the vehicle interior side. A part of the first molding portion 240 is held in the clamping portion 30, and the protruding portion of the first molding portion 240 constitutes the engaging portion 244 as a part of the molding 214.

In the second embodiment, the first molding portion 240 and the second molding portion 242 may be an extruded product formed continuously by extrusion. That is, the molding 214 may be an extruded product comprising the first molding portion 240 and the second molding portion 242. Since the engaging portion 244 has a length of 90% or more of the length in the vehicle width direction, the molding 214 may be continuously produced by extrusion. Thus, the molding 214 can be efficiently produced.

The cowl louver 18 has a clamping portion 30 having a U-form longitudinal cross section formed by a first clamping portion 32 and a second clamping portion 34, at its rear end side, in the same manner as the first embodiment. The second clamping portion 34 has an engaged portion 36 to be engaged with the engaging portion 244 of the molding 214. The engaged portion 36 may be composed of a plurality of through holes, a plurality of grooves, or a combination of a plurality of through holes and a plurality of ribs.

As shown in FIG. 5, the clamping portion 30 has first and second contact regions 38, located ahead of the engaged portion 36, and in contact with at least a part of the front portion 246 of the second molding portion 242.

The front portion 246 continuously extends in the vehicle width direction of the second molding portion 242, and is held in the clamping portion 30 of the cowl louver 18.

In the second embodiment, the front portion 246 has a lip 250 extending to the first clamping portion 32 side and in contact with the vehicle interior side surface of the first clamping portion 32. The lip 250 extends from the front end side of the front portion 246 toward the rear end side, and is so constituted as to be deformable at the connecting portion of the front portion 246 as a support. The lip 250 and the vehicle interior side surface of the first clamping portion 32 are in contact with each other to form a first contact region 38. The front portion 46 on the other side from the lip 250 is in contact with the vehicle interior side surface of the second clamping portion 34 to form a second contact region 38. The lip 250 is in contact with the first clamping portion 32 and is deformed. The front portion 246 in the second embodiment has a shape different from the front portion 46 in the first embodiment. In the second embodiment, the lip 250 is in contact with as pressed against the vehicle interior side surface of the first clamping portion 32 as one side of the clamping portion 30.

As shown in FIG. 5, in a state before the second molding portion 242 is held in the clamping portion 30, the length between the tip of the lip 250 of the front portion 246 and the position on the opposite side from the lip 250 of the front portion 246, in the longitudinal cross section, is longer than the distance between the vehicle interior side surface of the first clamping portion 32 and the vehicle exterior side surface of the second clamping portion 34 in at least a part of the contact region 38.

In the longitudinal cross section of the first and second contact regions 38, the distance between the contact regions of the clamping portion 30 and the front portion 246 have the above relation of the length, and accordingly it is possible to apply a pressure to the front portion 246, the vehicle interior side surface of the first clamping portion 32 and the vehicle exterior side surface of the second clamping portion 34 of the clamping portion 30. Accordingly, in the first contact region 38, the front portion 246 and the clamping portion 30 are brought into contact with each other by the pressure, and thus infiltration of water from outside the vehicle into the vehicle interior side can be prevented.

As shown in FIG. 5, in the contact region 38, the lip 250 of the front portion 246 and the vehicle interior side surface of first clamping portion 32 have a portion in contact with each other planarly. The front portion 246 on the opposite side from the lip 250 and the vehicle exterior side surface of the second clamping portion 34 are in contacted with each other linearly. The front portion 246 including the lip 250 is deformed to follow the inner wall of the clamping portion 30.

Between the front end portion of the second molding portion 242, and the inner wall of the clamping portion 30 formed by the vehicle interior side surface of the first clamping portion 32 and the vehicle exterior side surface of the second clamping portion 34, a gap S is present, in the same manner as the first embodiment.

As shown in FIG. 5, the second molding portion 242 has a protruding portion 248 protruding on the first glass plate 22 side and located between the first clamping portion 32 and the laminated glass 20. The first clamping portion 32, the protruding portion 248 and the first glass plate 22 are disposed on flush. The first clamping portion 32, the protruding portion 248 and the first glass plate 22 constitute a flush surface, in the same manner as the first embodiment. The flush includes a completely same plane and a substantially same plane.

Third Embodiment

Now, the connecting structure for a windshield with molding and a cowl louver according to a third embodiment of the present invention will be described with reference to FIG. 6. The identical or similar members to those in the first and second embodiments are described with the same symbols, and repetition of description may sometimes be omitted.

Figure 6:
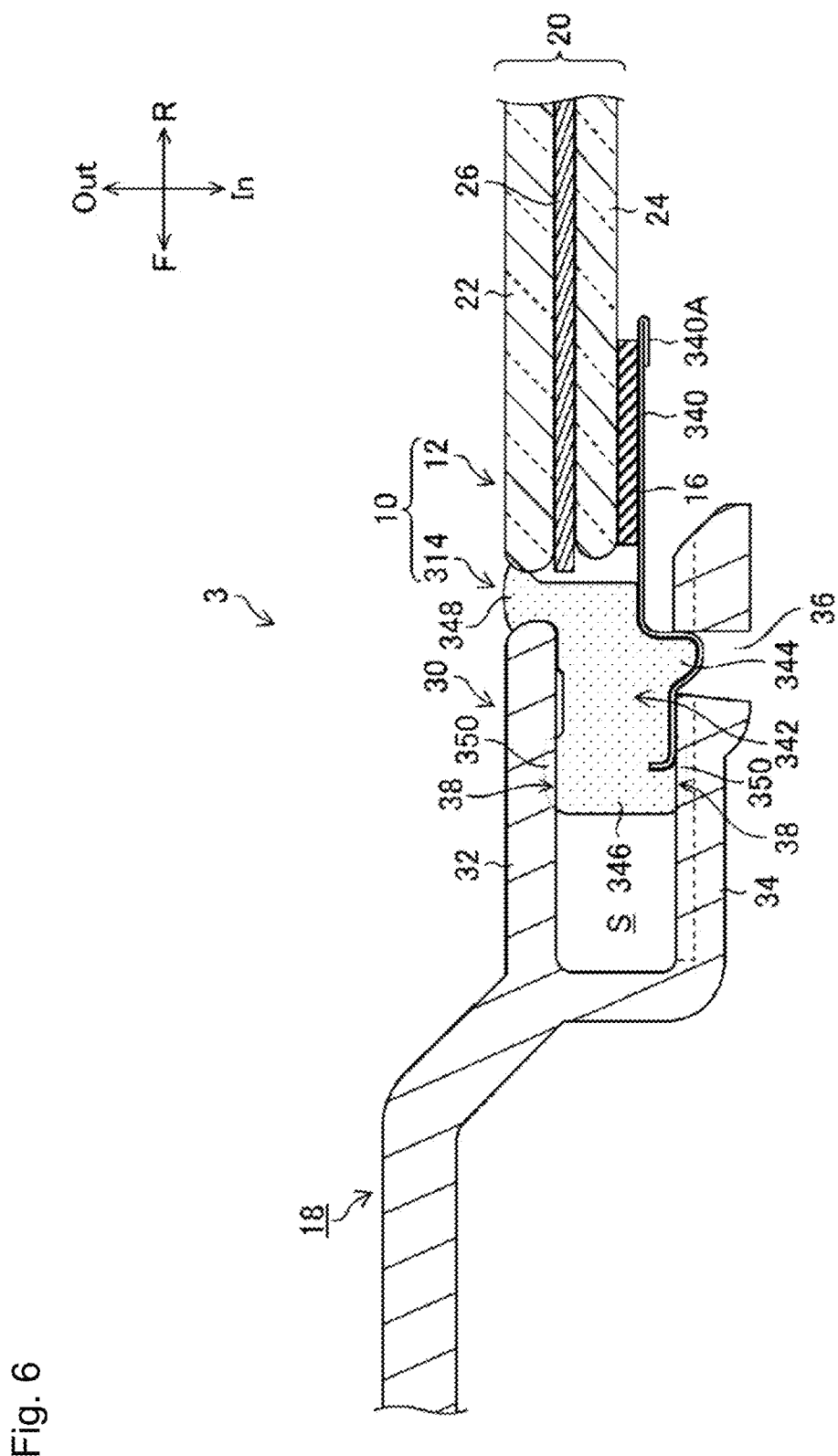
FIG. 6 is a cross sectional view illustrating a third embodiment of the present invention.

As shown in FIG. 6, the connecting structure 3 for a windshield with molding and a cowl louver according to the third embodiment comprises a windshield 10 with molding having a windshield 12 and a molding 314, and a cowl louver 18.

The windshield 12 is composed of, in the same manner as the first embodiment, a laminated glass 20 having a first glass plate 22, an interlayer 26 and a second glass plate 24.

As shown in FIG. 6, in the third embodiment, a molding 314 having a shape different from that in the first embodiment is provided. The molding 314 has a first molding portion 340, the upper surface of which is bonded to the vehicle interior side surface of the second glass plate 24 by means of a double-sided adhesive tape 16, and a second molding portion 342 held in a clamping portion 30 of the cowl louver 18 and extending from the first molding portion 340 toward the front (F) of the vehicle. The molding 314 has an engaging portion 344 protruding toward the vehicle interior (In) side, and the second molding portion 342 has a front portion 346 located ahead (F) of the engaging portion 344.

The first molding portion 340 according to the third embodiment, in the same manner as the first embodiment, is composed of a thin plate-formed metal member of e.g. stainless steel or steel. The first molding portion 340 has a bent portion 340A at its front end portion and extends toward the second molding portion 342.

The second molding portion 342, in the same manner as the first embodiment, is composed of a flexible resin member of e.g. a thermoplastic olefinic elastomer, Alcryn (registered trademark) or polyvinyl chloride.

The engaging portion 344 preferably has a length corresponding to 90% or more of the length in the vehicle width direction (left and right direction) of the second molding portion 342.

The molding 314 may be produced, in the same manner as the first embodiment, continuously by roll forming and extrusion. That is, the molding 314 may be a continuously formed product comprising the first molding portion 340 as a roll-formed product and the second molding portion 342 as an extruded product.

The cowl louver 18 has a clamping portion 30 having a U-form longitudinal cross section formed by a first clamping portion 32 and a second clamping portion 34, at its rear end side, in the same manner as the first embodiment. The second clamping portion 34 has an engaged portion 36 to be engaged with the engaging portion 344 of the molding 314. The engaged portion 36 may be composed of a plurality of through holes, a plurality of grooves, or a combination of a plurality of through holes and a plurality of ribs.

As shown in FIG. 6, the clamping portion 30 has first and second contact regions 38, located ahead of the engaged portion 36, and in contact with at least a part of the front portion 346 of the second molding portion 342.

The front portion 346 continuously extends in the vehicle width direction of the second molding portion 342, and is held in the clamping portion 30 of the cowl louver 18.

In the third embodiment, the front portion 346 has first and second thick portions 350, extending toward the first clamping portion 32 and second clamping portion 34 sides and in contact with the vehicle interior side surface of the first clamping portion 32 and the vehicle exterior side surface of the second clamping portion 34. The first and second thick portions 350 are in contact with the vehicle interior side surface of the first clamping portion 32 and the vehicle exterior side surface of the second clamping portion 34, respectively, to form first and second contact regions 38 at the first clamping portion 32 and the second clamping portion 34 of the clamping portion 30.

As shown in FIG. 6, in a state before the second molding portion 342 is held in the clamping portion 30, the total length of the first and second thick portions 350 at the front portion 346 in the longitudinal cross section, is longer than the distance between the vehicle interior side surface of the first clamping portion 32 and the vehicle exterior side surface of the second clamping portion 34 in at least a part of the first and second contact regions 38. The total length of the first and second thick portions 350 in the longitudinal cross section corresponds to the distance between the first and second thick portions 350 extending toward the first clamping portion 32 side and the second clamping portion 34 side respectively.

In the longitudinal cross section of the first and second contact regions 38, the distance between the contact regions of the clamping portion 30 and the front portion 346 have the above relation of the length, and accordingly it is possible to apply a pressure to the front portion 346, the vehicle interior side surface of the first clamping portion 32 and the vehicle exterior side surface of the second clamping portion 34 of the clamping portion 30. Accordingly, in the first second contact region 38, the front portion 346 and the clamping portion 30 are brought into contact with each other by the pressure, and thus infiltration of water from outside the vehicle into the vehicle interior side can be prevented.

As shown in FIG. 6, in the first and second contact regions 38, the two thick portions 350 of the front portion 346 have portions in contact with the first clamping portion 32 and the second clamping portion 34 of the clamping portion 30 planarly. Further, in the third embodiment, the molding 314 is injected into the clamping portion 30 and is in contact with as pressed against the vehicle interior side surface of the first clamping portion 32 and the vehicle exterior side surface of the second clamping portion 34. The front portion 346 including the first and second thick portions 350 is deformed to follow the inner wall of the clamping portion 30.

Between the front end portion of the second molding portion 342, and the inner wall of the clamping portion 30 formed by the vehicle interior side surface of the first clamping portion 32 and the vehicle exterior side surface of the second clamping portion 34, a gap S is present, in the same manner as the first embodiment.

As shown in FIG. 6, the second molding portion 342 has a protruding portion 348 protruding on the first glass plate 22 side and located between the first clamping portion 32 and the laminated glass 20. The first clamping portion 32, the protruding portion 348 and the first glass plate 22 are disposed on flush. The first clamping portion 32, the protruding portion 348 and the first glass plate 22 constitute a flush surface, in the same manner as the first embodiment. The flush includes a completely same plane and a substantially same plane.

Fourth Embodiment

Now, the connecting structure for a windshield with molding and a cowl louver according to a fourth embodiment of the present invention will be described with reference to FIG. 7. The identical or similar members to those in the first to third embodiments are described with the same symbols, and repetition of description may sometimes be omitted.

Figure 7:
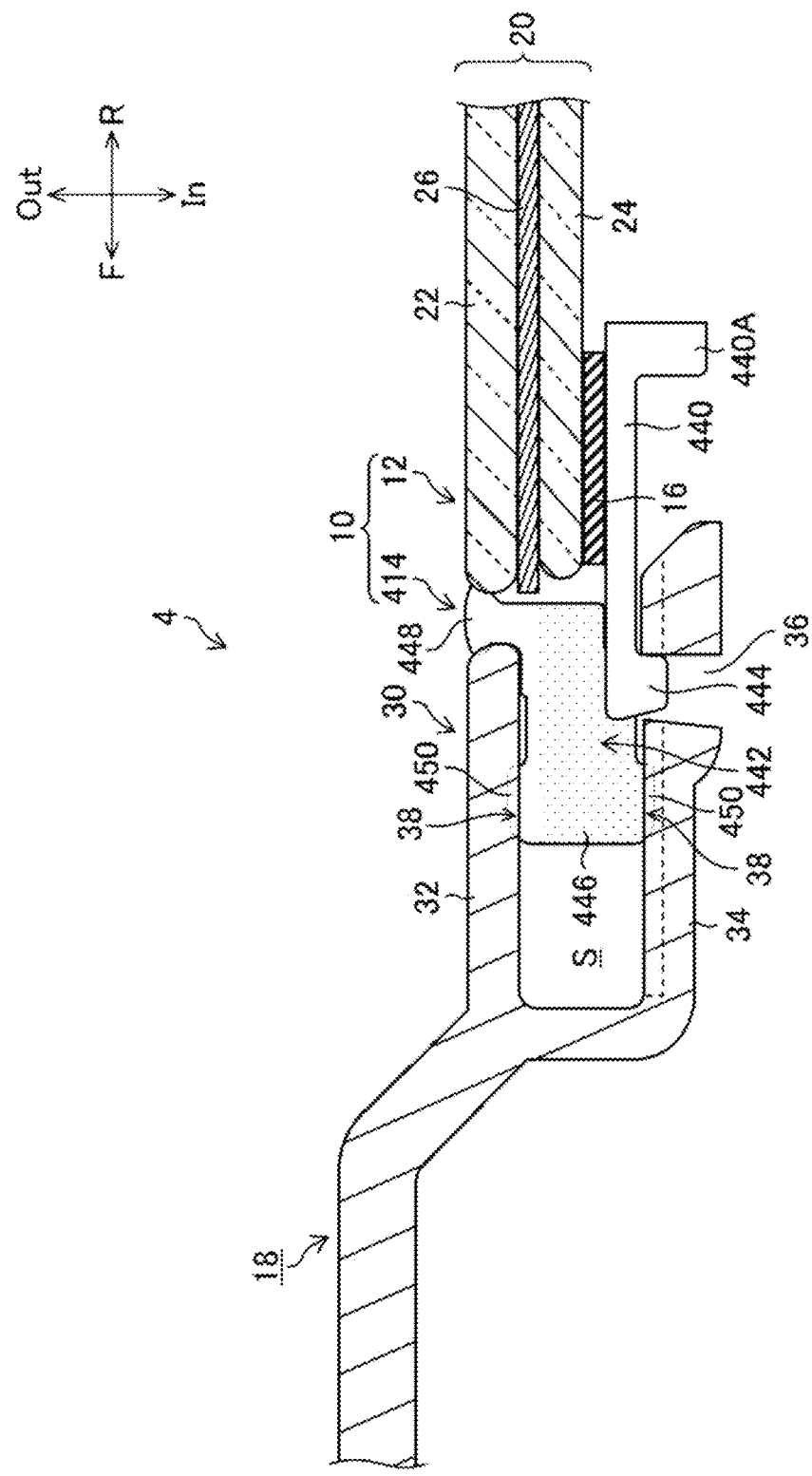
FIG. 7 is a cross sectional view illustrating a fourth embodiment of the present invention.

As shown in FIG. 7, the connecting structure 4 for a windshield with molding and a cowl louver according to the fourth embodiment comprises a windshield 10 with molding having a windshield 12 and a molding 414, and a cowl louver 18.

The windshield 12 is composed of, in the same manner as the first embodiment, a laminated glass 20 having a first glass plate 22, an interlayer 26 and a second glass plate 24.

As shown in FIG. 7, in the fourth embodiment, a molding 414 having a shape different from that in the first embodiment is provided. The molding 414 has a first molding portion 440, the upper surface of which is bonded to the vehicle interior side surface of the second glass plate 24 by means of a double-sided adhesive tape 16, and a second molding portion 442 held in a clamping portion 30 of the cowl louver 18 and extending from the first molding portion 440 toward the front (F) of the vehicle. The molding 414 has an engaging portion 444 protruding toward the vehicle interior (In) side, and the second molding portion 442 has a front portion 446 located ahead (F) of the engaging portion 444.

The first molding portion 440 in the fourth embodiment, in the same manner as the second embodiment, is composed of a rigid resin member of e.g. a thermoplastic olefinic elastomer (TPO) or polyvinyl chloride (PVC). The rear end side of the first molding portion 440 has a protruding portion 440A protruding toward the vehicle interior side. The first molding portion 440 extends toward the second molding portion 442.

The second molding portion 442, in the same manner as the third embodiment, is composed of a flexible resin member of e.g. a thermoplastic olefinic elastomer, Alcryn (registered trademark) or polyvinyl chloride.

The engaging portion 444 preferably has a length corresponding to 90% or more of the length in the vehicle width direction (left and right direction) of the second molding portion 442. In the same manner as the second embodiment, the protruding portion of the first molding portion 440 constitutes the engaging portion 444 as a part of the second molding portion 442.

The molding 414 may be an extruded product formed continuously by extrusion, in the same manner as the second embodiment. That is, the molding 414 may be an extruded product comprising the first molding portion 440 and the second molding portion 442. Thus, the molding 414 can be efficiently produced.

The cowl louver 18 has a clamping portion 30 having a U-form longitudinal cross section formed by a first clamping portion 32 and a second clamping portion 34, at its rear end side, in the same manner as the first embodiment. The second clamping portion 34 has an engaged portion 36 to be engaged with the engaging portion 444 of the molding 414.

As shown in FIG. 7, the clamping portion 30 has first and second contact regions 38, located ahead of the engaged portion 36, and in contact with at least a part of the front portion 446 of the second molding portion 442.

The front portion 446 continuously extends in the vehicle width direction of the second molding portion 442, and is held in the clamping portion 30 of the cowl louver 18.

In the fourth embodiment, in the same manner as the third embodiment, the front portion 446 has first and second thick portions 450, extending toward the first clamping portion 32 and second clamping portion 34 sides and in contact with the vehicle interior side surface of the first clamping portion 32 and the vehicle exterior side surface of the second clamping portion 34. The first and second thick portions 450 are in contact with the vehicle interior side surface of the first clamping portion 32 and the vehicle exterior side surface of the second clamping portion 34, to form first and second contact regions 38 at the first clamping portion 32 and the second clamping portion 34 of the clamping portion 30.

As shown in FIG. 7, in the fourth embodiment, in the same manner as the third embodiment, in a state before the second molding portion 442 is held in the clamping portion 30, the total length of the first and second thick portions 450 of the front portion 446 in the longitudinal cross section, is longer than the distance between the vehicle interior side surface of the first clamping portion 32 and the vehicle exterior side surface of the second clamping portion 34 in at least a part of the first and second contact regions 38. The total length of the first and second thick portions 450 in the longitudinal cross section corresponds to the distance between the first and second thick portions 450 extending toward the first clamping portion 32 side and the second clamping portion 34 side respectively.

In the longitudinal cross section of the first and second contact regions 38, the distance between the contact regions of the clamping portion 30 and the front portion 446 have the above relation of the length, and accordingly it is possible to apply a pressure to the front portion 446, the vehicle interior side surface of the first clamping portion 32 and the vehicle exterior side surface of the second clamping portion 34 of the clamping portion 30. Accordingly, in the first second contact region 38, the front portion 446 and the clamping portion 30 are brought into contact with each other by the pressure, and thus infiltration of water from outside the vehicle into the vehicle interior side can be prevented.

As shown in FIG. 7, in the first and second contact regions 38, the two thick portions 450 of the front portion 446 have portions in contact with the first clamping portion 32 and the second clamping portion 34 of the clamping portion 30 planarly. Further, in the fourth embodiment, the molding 414 is injected into the clamping portion 30 and is in contact with as pressed against the vehicle interior side surface of the first clamping portion 32 and the vehicle exterior side surface of the second clamping portion 34. The front portion 446 including the first and second thick portions 450 is deformed to follow the inner wall of the clamping portion 30.

Between the front end portion of the second molding portion 442, and the inner wall of the clamping portion 30 formed by the vehicle interior side surface of the first clamping portion 32 and the vehicle exterior side surface of the second clamping portion 34, a gap S is present, in the same manner as the first embodiment.

As shown in FIG. 7, the second molding portion 442 has a protruding portion 448 protruding on the first glass plate 22 side and located between the first clamping portion 32 and the laminated glass 20. The first clamping portion 32, the protruding portion 448 and the first glass plate 22 are disposed on flush. The first clamping portion 32, the protruding portion 448 and the first glass plate 22 constitute a flush surface, in the same manner as the first embodiment. The flush includes a completely same plane and a substantially same plane.

Fifth Embodiment

Now, the connecting structure for a windshield with molding and a cowl louver according to a fifth embodiment of the present invention will be described with reference to FIG. 8. The identical or similar members to those in the first to fourth embodiments are described with the same symbols, and repetition of description may sometimes be omitted.

Figure 8:
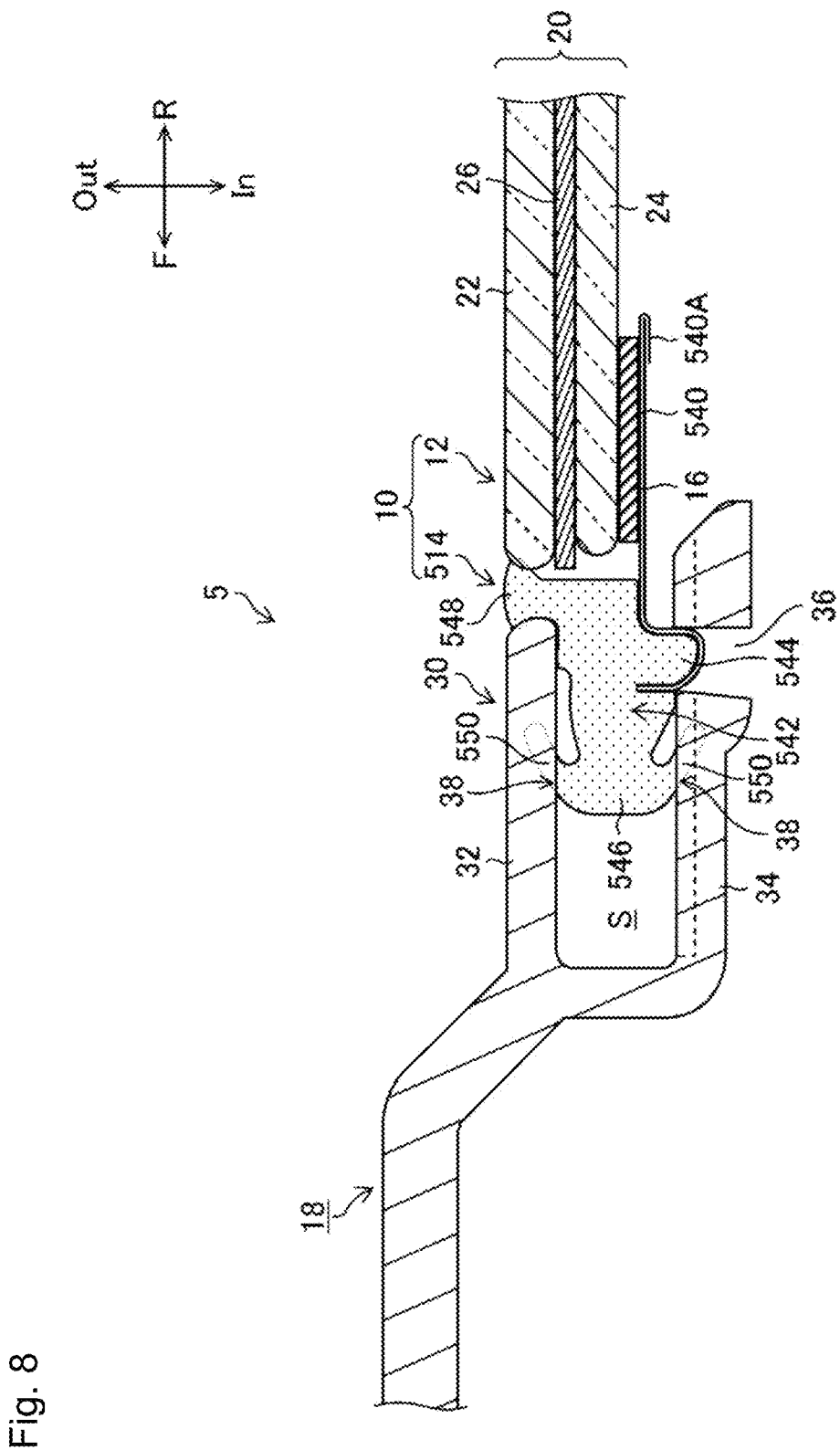
FIG. 8 is a cross sectional view illustrating a fifth embodiment of the present invention.

As shown in FIG. 8, the connecting structure 5 for a windshield with molding and a cowl louver according to the fifth embodiment comprises a windshield 10 with molding having a windshield 12 and a molding 514, and a cowl louver 18.

The windshield 12 is composed of, in the same manner as the first embodiment, a laminated glass 20 having a first glass plate 22, an interlayer 26 and a second glass plate 24.

As shown in FIG. 8, in the fifth embodiment, a molding 514 having a shape different from that in the first embodiment is provided. The molding 514 has a first molding portion 540, the upper surface of which is bonded to the vehicle interior side surface of the second glass plate 24 by means of a double-sided adhesive tape 16, and a second molding portion 542 held in the clamping portion 30 of the cowl louver 18 and extending from the first molding portion 540 toward the front (F) of the vehicle. The molding 514 has an engaging portion 544 protruding toward the vehicle interior (In) side, and the second molding portion 542 has a front portion 546 located ahead (F) of the engaging portion 544.

The first molding portion 540 in the fifth embodiment, in the same manner as the first embodiment, is composed of a plate-formed metal member of e.g. stainless steel or teel. The first molding portion 540 has a bent portion 540A at its front end portion and extends toward the second molding portion 42.

The second molding portion 542, in the same manner as the first embodiment, is composed of a flexible resin member of e.g. a thermoplastic olefinic elastomer, Alcryn (registered trademark) or polyvinyl chloride.

The engaging portion 544 preferably has a length corresponding to 90% or more of the length in the vehicle width direction (left and right direction) of the second molding portion 542.

The molding 514 may be continuously produced by roll forming and extrusion in the same manner as the first embodiment. That is, the molding 514 may be a continuously formed product comprising the first molding portion 540 as a roll formed product and the second molding portion 542 as an extruded product.

The cowl louver 18 has a clamping portion 30 having a U-form longitudinal cross section formed by a first clamping portion 32 and a second clamping portion 34, at its rear end side, in the same manner as the first embodiment. The second clamping portion 34 has an engaged portion 36 to be engaged with the engaging portion 544 of the molding 514. The engaged portion 36 may be composed of a plurality of through holes, a plurality of grooves, or a combination of a plurality of through holes and a plurality of ribs.

As shown in FIG. 8, the clamping portion 30 has first and second contact regions 38, located ahead of the engaged portion 36, and in contact with at least a part of the front portion 546 of the second molding portion 542.

The front portion 546 continuously extends in the vehicle width direction of the second molding portion 542, and is held in the clamping portion 30 of the cowl louver 18.

In the fifth embodiment, the front portion 546 has first and second lips 550, extending toward the first clamping portion 32 and second clamping portion 34 sides and in contact with the vehicle interior side surface of the first clamping portion 32 and the vehicle exterior side surface of the second clamping portion 34. The respective lips 550 extend from the front end side toward the rear end side of the front portion 546 and are so constituted as to be deformable at the connecting portion of the front portion 546 as a support. The first and second lips 550 are in contact with the vehicle interior side surface of the first clamping portion 32 and the vehicle exterior side surface of the second clamping portion 34, respectively, and the first and second lip portions 550 are deformed, to form first and second contact regions 38 at the first clamping portion 32 and the second clamping portion 34 of the clamping portion 30.

As shown in FIG. 8, in a state before the second molding portion 542 is held in the clamping portion 30, the total length of the first and second lips 550 of the front portion 546 in the longitudinal cross section, is longer than the distance between the vehicle interior side surface of the first clamping portion 32 and the vehicle exterior side surface of the second clamping portion 34 in at least a part of the first and second contact regions 38. The total length of the first and second lips 550 in the longitudinal cross section corresponds to the distance between the rear end portions of the first and second lips 550 extending toward the first clamping portion 32 side and the second clamping portion 34 side respectively.

In the longitudinal cross section of the first and second contact regions 38, the distance between the contact regions of the clamping portion 30 and the front portion 546 have the above relation of the length, and accordingly it is possible to apply a pressure to the front portion 546, the vehicle interior side surface of the first clamping portion 32 and the vehicle exterior side surface of the second clamping portion 34 of the clamping portion 30. Accordingly, in the first and second contact regions 38, the front portion 546 and the clamping portion 30 are brought into contact with each other by the pressure, and thus infiltration of water from outside the vehicle into the vehicle interior side can be prevented.

As shown in FIG. 8, in the first and second contact regions 38, the first and second lips 550 of the front portion 546 have portions in contact with the first clamping portion 32 and the second clamping portion 34 of the clamping portion 30 planarly. The front portion 546 including the first and second lips 550 is deformed to follow the inner wall of the clamping portion 30.

Between the front end portion of the second molding portion 542, and the inner wall of the clamping portion 30 formed by the vehicle interior side surface of the first clamping portion 32 and the vehicle exterior side surface of the second clamping portion 34, a gap S is present, in the same manner as the first embodiment.

As shown in FIG. 8, the second molding portion 542 has a protruding portion 548 protruding on the first glass plate 22 side and located between the first clamping portion 32 and the laminated glass 20. The first clamping portion 32, the protruding portion 548 and the first glass plate 22 are disposed on flush. The first clamping portion 32, the protruding portion 548 and the first glass plate 22 constitute a flush surface, in the same manner as the first embodiment. The flush includes a completely same plane and a substantially same plane.

Sixth Embodiment

Now, the connecting structure for a windshield with molding and a cowl louver according to a sixth embodiment of the present invention will be described with reference to FIG. 9. The identical or similar members to those in the first to fifth embodiments are described with the same symbols, and repetition of description may sometimes be omitted.

Figure 9:
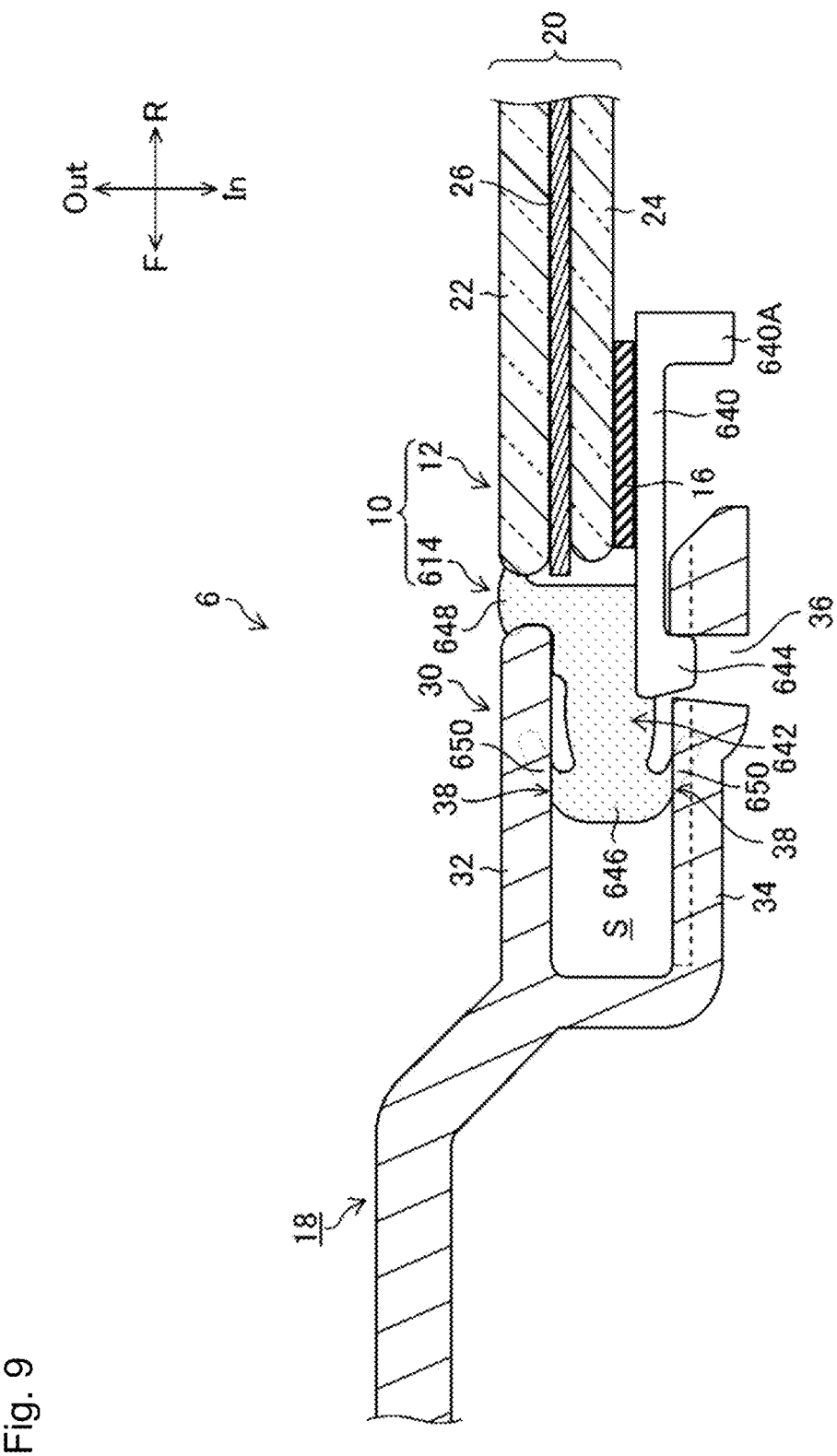
FIG. 9 is a cross sectional view illustrating a sixth embodiment of the present invention.

As shown in FIG. 9, the connecting structure 6 for a windshield with molding and a cowl louver according to the sixth embodiment comprises a windshield 10 with molding having a windshield 12 and a molding 614, and a cowl louver 18.

The windshield 12 is composed of, in the same manner as the first embodiment, a laminated glass 20 having a first glass plate 22, an interlayer 26 and a second glass plate 24.

As shown in FIG. 9, in the sixth embodiment, a molding 614 having a shape different from that in the first embodiment is provided. The molding 614 has a first molding portion 640, the upper surface of which is bonded to the vehicle interior side surface of the second glass plate 24 by means of a double-sided adhesive tape 16, and a second molding portion 642 held in a clamping portion 30 of the cowl louver 18 and extending from the first molding portion 640 toward the front (F) of the vehicle. The molding 614 has an engaging portion 644 protruding toward the vehicle interior (In) side, and the second molding portion 642 has a front portion 646 located ahead (F) of the engaging portion 644.

The first molding portion 640 in the sixth embodiment, in the same manner as the fourth embodiment, is composed of a rigid resin member of e.g. a thermoplastic olefinic elastomer (TPO) or polyvinyl chloride (PVC). The rear end side of the first molding portion 640 has a protruding portion 640A protruding toward the vehicle interior side. The first molding portion 640 extends toward the second molding portion 642.

The second molding portion 642, in the same manner as the first embodiment, is composed of a flexible resin member of e.g. a thermoplastic olefinic elastomer, Alcryn (registered trademark) or polyvinyl chloride.

The engaging portion 644 preferably has a length corresponding to 90% or more of the length in the vehicle width direction (left and right direction) of the second molding portion 642. In the same manner as the second embodiment, the protruding portion of the first molding portion 640 constitutes the engaging portion 644 as a part of the molding 614.

The molding 614 may be, in the same manner as the fourth embodiment, an extruded product formed continuously by extrusion. That is, the molding 614 may be an extruded product comprising the first molding portion 640 and the second molding portion 642. Thus, the molding 614 can be efficiently produced.

The cowl louver 18 has a clamping portion 30 having a U-form longitudinal cross section formed by a first clamping portion 32 and a second clamping portion 34, at its rear end side, in the same manner as the first embodiment. The second clamping portion 34 has an engaged portion 36 to be engaged with the engaging portion 644 of the molding 614. The engaged portion 36 may be composed of a plurality of through holes, a plurality of grooves, or a combination of a plurality of through holes and a plurality of ribs.

As shown in FIG. 9, the clamping portion 30 has first and second contact regions 38, located ahead of the engaged portion 36, and in contact with at least a part of the front portion 646 of the second molding portion 642.

The front portion 646 continuously extends in the vehicle width direction of the second molding portion 642, and is held in the clamping portion 30 of the cowl louver 18. In the sixth embodiment, in the same manner as the fifth embodiment, the front portion 646 has first and second lips 650 extending toward the first clamping portion 32 and second clamping portion 34 sides, in contact with the vehicle interior side surface of the first clamping portion 32 and the vehicle exterior side surface of the second clamping portion 34. The respective lips 650 extend from the front end side toward the rear end side of the front portion 646 and are so constituted as to be deformable at the connecting portion of the front portion 646 as a support. The first and second lips 650 are in contact with the vehicle interior side surface of the first clamping portion 32 and the vehicle exterior side surface of the second clamping portion 34, and the first and second lips 650 are deformed to form first and second contact regions 38 on the first clamping portion 32 and the second clamping portion 35 of the clamping portion 30 respectively.

As shown in FIG. 9, in a state before the second molding portion 642 is held in the clamping portion 30, the total length of the first and second lips 560 of the front portion 646 in the longitudinal cross section, is longer than the distance between the vehicle interior side surface of the first clamping portion 32 and the vehicle exterior side surface of the second clamping portion 34 in at least a part of the first and second contact regions 38.

In the longitudinal cross section of the contact region 38, the distance between the contact regions of the clamping portion 30 and the front portion 646 have the above relation of the length, and accordingly it is possible to apply a pressure to the front portion 646, the vehicle interior side surface of the first clamping portion 32 and the vehicle exterior side surface of the second clamping portion 34 of the clamping portion 30. Accordingly, in the first and second contact regions 38, the front portion 646 and the clamping portion 30 are brought into contact with each other by the pressure, and thus infiltration of water from outside the vehicle into the vehicle interior side can be prevented.

As shown in FIG. 9, in the first and second contact regions 38, the two lips 550 of the front portion 646 have portions in contact with the clamping portion 30 planarly. The front portion 646 including the first and second lips 650 is deformed to follow the inner wall of the clamping portion 30.

Between the front end portion of the second molding portion 642, and the inner wall of the clamping portion 30 formed by the vehicle interior side surface of the first clamping portion 32 and the vehicle exterior side surface of the second clamping portion 34, a gap S is present, in the same manner as the first embodiment.

As shown in FIG. 9, the second molding portion 642 has a protruding portion 648 protruding on the first glass plate 22 side and located between the first clamping portion 32 and the laminated glass 20. The first clamping portion 32, the protruding portion 648 and the first glass plate 22 are disposed on flush. The first clamping portion 32, the protruding portion 648 and the first glass plate 22 constitute a flush surface, in the same manner as the first embodiment. The flush includes a completely same plane and a substantially same plane.

Seventh Embodiment

Now, the connecting structure for a windshield with molding and a cowl louver according to a seventh embodiment of the present invention will be described with reference to FIG. 10. The identical or similar members to those in the first to sixth embodiments are described with the same symbols, and repetition of description may sometimes be omitted.

Figure 10:
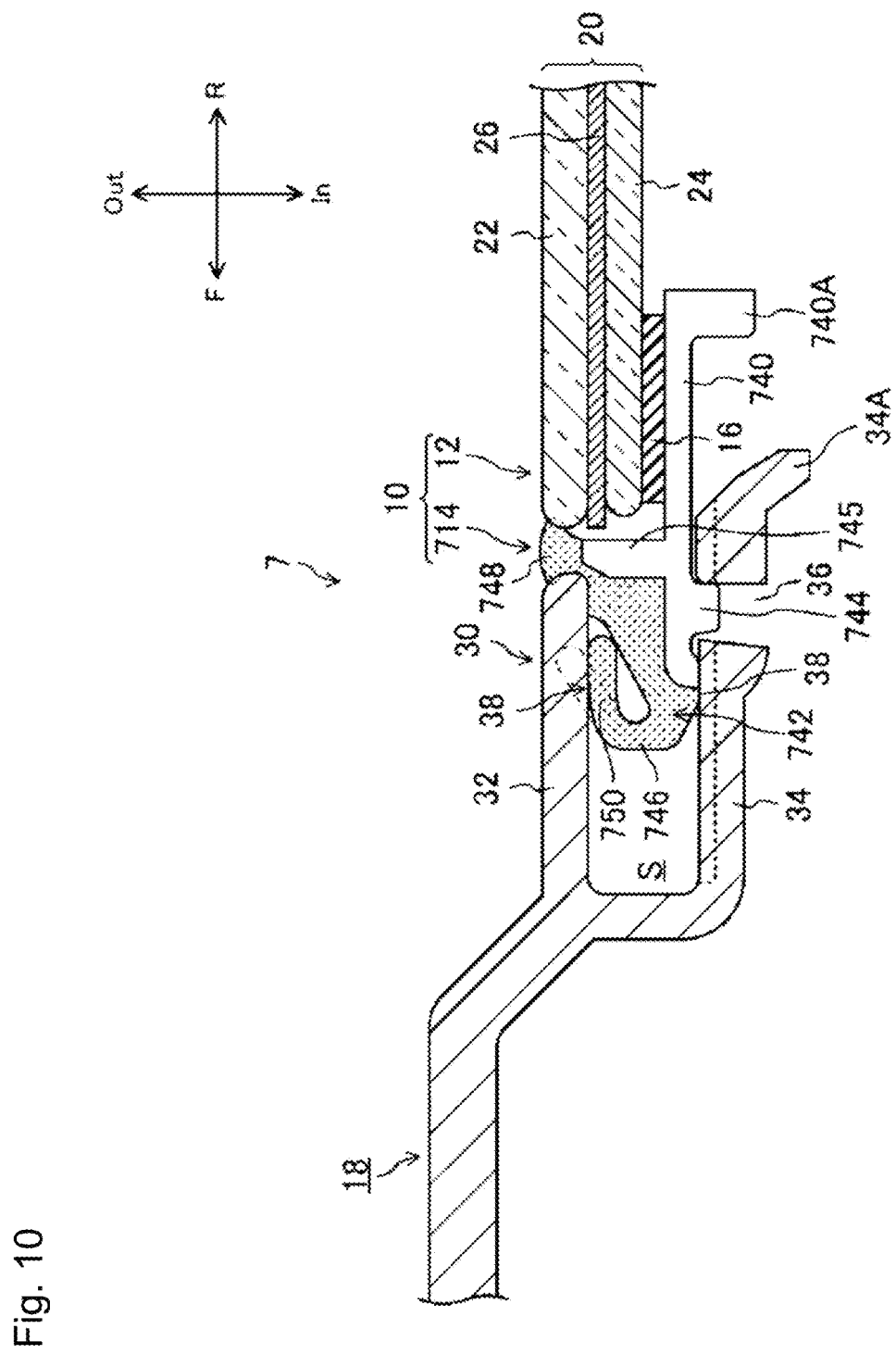
FIG. 10 is a cross sectional view illustrating a seventh embodiment of the present invention.

As shown in FIG. 10, the connecting structure 7 for a windshield with molding and a cowl louver according to the seventh embodiment comprises a windshield 10 with molding having a windshield 12 and a molding 714, and a cowl louver 18.

The windshield 12 is composed of, in the same manner as the first embodiment, a laminated glass 20 having a first glass plate 22, an interlayer 26 and a second glass plate 24.

As shown in FIG. 10, in the seventh embodiment, a molding 714 having a shape different from that in the first embodiment is provided. The molding 714 has a first molding portion 740, the upper surface of which is bonded to the vehicle interior side surface of the second glass plate 24 by means of a double-sided adhesive tape 16, and a second molding portion 742 held in a clamping portion 30 of the cowl louver 18 and extending from the first molding portion 740 toward the front (F) of the vehicle. The molding 714 has, in the first molding portion 740, an engaging portion 744 protruding toward the vehicle interior (In) side, and a standing wall portion 745 protruding from the first molding portion 740 toward the vehicle exterior side along the edge portion of the windshield 12, and the second molding portion 742 has a front portion 746 located ahead (F) of the engaging portion 744.

The first molding portion 740 in the seventh embodiment, in the same manner as the fourth and sixth embodiments, is composed of a rigid resin member of e.g. a thermoplastic olefinic elastomer (TPO) or polyvinyl chloride (PVC). The rear end side of the first molding portion 740 has a protruding portion 740A protruding toward the vehicle interior side. The first molding portion 740 extends toward the second molding portion 742. Further, the first molding portion 740 has a standing wall portion 745 protruding toward the vehicle exterior side along the edge surface on the front end of the windshield 12. By the first molding portion 740 in the seventh embodiment having the standing wall portion 745 composed of a rigid resin member, stiffness of the molding 714 can be increased.

The second molding portion 742, in the same manner as the first embodiment, is composed of a flexible resin member such as a thermoplastic olefinic elastomer, Alcryn (registered trademark) or polyvinyl chloride.

The engaging portion 744 preferably has a length corresponding to 90% or more of the length in the vehicle width direction (left and right direction) of the second molding portion 742. In the same manner as the second embodiment, the protruding portion of the first molding portion 740 constitutes an engaging portion 744 as a part of the molding 714.

The molding 714 may be, in the same manner as the fourth and sixth embodiments, an extruded product formed continuously by extrusion. That is, the molding 714 may be an extruded product comprising the first molding portion 740 and the second molding portion 742. Thus, the molding 714 can be efficiently produced.

The cowl louver 18 has a clamping portion 30 having a U-form longitudinal cross section formed by a first clamping portion 32 and a second clamping portion 34, at its rear end side, in the same manner as the first embodiment. The second clamping portion 34 has an engaged portion 36 to be engaged with the engaging portion 744 of the molding 714. The engaged portion 36 may be composed of a plurality of through holes, a plurality of grooves, or a combination of a plurality of through holes and a plurality of ribs. Further, the second clamping portion 34 has a guide portion 34A protruding toward the vehicle interior side, at its rear end side. By the second clamping portion 34 having the guide portion 34A protruding toward the vehicle interior side, at its rear end side, the molding 714 is easily inserted into the clamping portion 30 of the cowl louver 18.

As shown in FIG. 10, the clamping portion 30 has first and second contact regions 38, located ahead of the engaged portion 36, and in contact with at least a part of the front portion 746 of the second molding portion 742.

As shown in FIG. 10, in a state before the second molding portion 742 is held in the clamping portion 30, the length of a lip 750 of the front portion 746 in the longitudinal cross section, is longer than the distance between the vehicle interior side surface of the first clamping portion 32 and the vehicle exterior side surface of the second clamping portion 34 in at least a part of the first and second contact regions 38.

In the longitudinal cross section of the contact region 38, the distance between the contact regions of the clamping portion 30 and the front portion 746 have the above relation of the length, and accordingly it is possible to apply a pressure to the front portion 746, the vehicle interior side surface of the first clamping portion 32 and the vehicle exterior side surface of the second clamping portion 34 of the clamping portion 30. Accordingly, in the first and second contact regions 38, the front portion 746 and the clamping portion 30 are brought into contact with each other by the pressure, and thus infiltration of water from outside the vehicle into the vehicle interior side can be prevented.

The front portion 746 extends continuously in the vehicle width direction of the second molding portion 742, and is held in the clamping portion 30 of the cowl louver 18. In the seventh embodiment, in the same manner as the second embodiment, the lip 750 of the front portion 746 and the vehicle interior side surface of the first clamping portion 32 have a portion in contact with each other planarly. The front portion 746 on the opposite side from the lip 750 and the vehicle exterior side surface of the second clamping portion 34 are in contact with each other linearly. The front portion 746 including the lip 750 is deformed to follow the inner wall of the clamping portion 30.

As shown in FIG. 10, in the first and second contact regions 38, the lip 750 of the front portion 746 and the vehicle interior side surface of the first clamping portion 32 have a portion in contact with each other planarly. The front portion 746 on the opposite side from the lip 750 and the vehicle exterior side surface of the second clamping portion 34 are in contact with each other linearly. The front portion 746 including the lip 750 is deformed to follow the inner wall of the clamping portion 30.

Between the front end portion of the second molding portion 742, and the inner wall of the clamping portion 30 formed by the vehicle interior side surface of the first clamping portion 32 and the vehicle exterior side surface of the second clamping portion 34, a gap S is present, in the same manner as the first embodiment.

As shown in FIG. 10, the second molding portion 742 has a protruding portion 748 protruding on the first glass plate 22 side and located between the first clamping portion 32 and the laminated glass 20. The first clamping portion 32, the protruding portion 748 and the first glass plate 22 are disposed on flush. The first clamping portion 32, the protruding portion 748 and the first glass plate 22 constitute a flush surface, in the same manner as the first embodiment. The flush includes a completely same plane and a substantially same plane.

The present invention has been described above, however, the present invention is by no means restricted to the above examples, and various changes and modifications are possible without departing from the intention and the scope of the present invention.

REFERENCE SYMBOLS 1,2,3,4,5,6: connecting structure for a windshield with molding and a cowl louver, 10: windshield with molding, 12: windshield, 14: molding, 16: double-sided adhesive tape, 18: cowl louver, 20: laminated glass, 22: first glass plate, 24: second glass plate, 26: interlayer, 30: clamping portion, 32: first clamping portion, 34: second clamping portion, 34A: guide portion, 36: engaged portion, 38: contact region, 40: first molding portion, 40A: bent portion, 42: second molding portion, 44: engaging portion, 46: front portion, 48: protruding portion, 240: first molding portion, 240A: protruding portion, 242: second molding portion, 244: engaging portion, 246: front portion, 248: protruding portion, 250: lip, 340: first molding portion, 340A: bent portion, 342: second molding portion, 344: engaging portion, 346: front portion, 348: protruding portion, 350: thick portion, 440: first molding portion, 440A: protruding portion, 442: second molding portion, 444: engaging portion, 446: front portion, 448: protruding portion, 450: thick portion, 540: first molding portion, 540A: bent portion, 542: second molding portion, 544: engaging portion, 546: front portion, 548: protruding portion, 550: lip, 640: first molding portion, 640A: protruding portion, 642: second molding portion, 644: engaging portion, 646: front portion, 648: protruding portion, 650: lip, 740: first molding portion, 740A: protruding portion, 742: second molding portion, 744: engaging portion, 745: standing wall portion, 746: front portion, 748: protruding portion, 750: lip, S: gap

What is claimed is:

1. A connecting structure for a windshield with molding and a cowl louver, to be attached to a vehicle,
wherein the windshield with molding has a laminated glass having a first glass plate to be disposed on the vehicle exterior side, a second glass plate to be disposed on the vehicle interior side, and an interlayer to bond the first glass plate and the second glass plate, and a molding assembled on the lower edge portion of the laminated glass,
the cowl louver has a clamping portion having a U-form longitudinal cross section formed by a first clamping portion exposed to the vehicle exterior side at the vehicle rear end side, and a second clamping portion formed on the vehicle interior side of the cowl louver, extending toward the rear side of the vehicle with a predetermined distance from the first clamping portion, the molding and the cowl louver are fitted by the clamping portion, the molding has a first molding portion, the upper side of which is bonded to the vehicle interior side surface of the second glass plate, a second molding portion held in the clamping portion, extending from the first molding portion toward the front of the vehicle, and an engaging portion protruding toward the vehicle interior side surface, the second molding portion has a front portion located ahead of the engaging portion, the second clamping portion has an engaged portion to be engaged with the engaging portion, the clamping portion has a contact region located ahead of the engaged portion and in contact with at least a part of the front portion, and in a state before the second molding portion is held in the clamping portion, the length of at least a part of the front portion in the longitudinal cross section is longer than the distance between the vehicle interior side surface of the first clamping portion and the vehicle exterior side surface of the second clamping portion in at least a part of the contact region.

2. The connecting structure for a windshield with molding and a cowl louver according to claim 1, wherein the engaged portion is formed at a distance along the vehicle width direction in the clamping portion.

3. The connecting structure for a windshield with molding and a cowl louver according to claim 1, wherein the engaging portion has a length corresponding to 90% or more of the length in the vehicle width direction of the second molding portion.

4. The connecting structure for a windshield with molding and a cowl louver according to claim 1, wherein the second clamping portion has a shape continuously extending in the vehicle width direction.

5. The connecting structure for a windshield with molding and a cowl louver according to claim 1, wherein the front portion has at least one lip.

6. The connecting structure for a windshield with molding and a cowl louver according to claim 1, wherein the second molding portion has a protruding portion protruding toward the first glass plate side and located between the first clamping portion and the laminated glass, and the first clamping portion, the protruding portion and the first glass plate are disposed on flush.

7. The connecting structure for a windshield with molding and a cowl louver according to claim 1, wherein a gap is present between the front end portion of the second molding portion, and the inner wall of the clamping portion formed by the vehicle interior side surface of the first clamping portion and the vehicle exterior side surface of the second clamping portion.

8. The connecting structure for a windshield with molding and a cowl louver according to claim 1, wherein in the molding, the first molding portion is composed of a metal member, and the second molding portion is composed of a resin member.

9. The connecting structure for a windshield with molding and a cowl louver according to claim 1, wherein in the molding, the first molding portion and the second molding portion are composed of a resin member.

10. The connecting structure for a windshield with molding and a cowl louver according to claim 9, wherein the resin member composing the first molding portion and the resin member composing the second molding portion are different from each other.

11. The connecting structure for a windshield with molding and a cowl louver according to claim 1, wherein in the contact region, the front portion and the clamping portion have a portion to be in contact with each other planarly.

12. The connecting structure for a windshield with molding and a cowl louver according to claim 1, wherein in the contact region, the front portion and the clamping portion have a portion to be in contact with each other linearly.

13. The connecting structure for a windshield with molding and a cowl louver according to claim 1, wherein in the contact region, the front portion is in contact with as pressed against one of the vehicle interior side surface of the first clamping portion and the vehicle exterior side surface of the second clamping portion.

* * * * *